(12) United States Patent
Kang et al.

(10) Patent No.: US 12,547,287 B2
(45) Date of Patent: Feb. 10, 2026

(54) DISPLAY DEVICE AND POSITION INPUT SYSTEM INCLUDING THE SAME

(71) Applicant: SAMSUNG DISPLAY CO., LTD., Yongin-si (KR)

(72) Inventors: Hyun Chang Kang, Yongin-si (KR); Jae Kyoung Kim, Yongin-si (KR); Chang Woo Shim, Yongin-si (KR); Dae Young Lee, Yongin-si (KR); Deok Jun Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/020,002

(22) Filed: Jan. 14, 2025

(65) Prior Publication Data

US 2025/0370578 A1    Dec. 4, 2025

(30) Foreign Application Priority Data

Jun. 4, 2024 (KR) .................. 10-2024-0073177

(51) Int. Cl.
*G06F 3/044* (2006.01)
*H10K 59/38* (2023.01)
*H10K 59/40* (2023.01)

(52) U.S. Cl.
CPC ........... *G06F 3/0447* (2019.05); *H10K 59/38* (2023.02); *H10K 59/40* (2023.02)

(58) Field of Classification Search
CPC ....... G06F 3/0447; H10K 59/38; H10K 59/40
See application file for complete search history.

(56) References Cited

U.S. PATENT DOCUMENTS

| 2014/0028744 | A1* | 1/2014 | Hashi | G09G 3/3406 345/697 |
|---|---|---|---|---|
| 2014/0267186 | A1* | 9/2014 | Kreek | G06F 1/3259 345/179 |
| 2023/0221810 | A1* | 7/2023 | Yoo | G06F 3/0421 345/179 |
| 2023/0229271 | A1* | 7/2023 | Jeong | H10K 59/40 345/173 |
| 2023/0288997 | A1* | 9/2023 | Yoo | G06F 3/0321 |

FOREIGN PATENT DOCUMENTS

KR    10-0557474 B1    3/2006

\* cited by examiner

*Primary Examiner* — Pegeman Karimi
(74) *Attorney, Agent, or Firm* — F. CHAU & ASSOCIATES, LLC

(57) ABSTRACT

A display device includes: a display unit including display pixels and light sensing pixels that are disposed in a preset code pattern shape in an image display area; a touch sensing unit formed on the display unit and configured to detect a touch position of a user; and a color filter layer disposed on the display pixels and the light sensing pixels, wherein the display pixels and the light sensing pixels are disposed in combination with each other in the preset code pattern shape to form code patterns for detecting position coordinates of a position input device.

20 Claims, 12 Drawing Sheets

USP1: SP1, SP2, SP3, LSP1

DISPLAY DEVICE AND POSITION INPUT SYSTEM INCLUDING THE SAME

CROSS-REFERENCE TO RELATED APPLICATION

This application claims priority under 35 U.S.C. § 119 to Korean Patent Application No. 10-2024-0073177, filed on Jun. 4, 2024, in the Korean Intellectual Property Office, the disclosure of which is incorporated by reference herein in its entirety.

TECHNICAL FIELD

Embodiments of the present invention relate to a display device and a position input system including the same.

DISCUSSION OF THE RELATED ART

As the transmission of information continues to increase throughout society, demands for display devices for displaying images and information are increasing in various forms. For example, display devices are applied to various electronic devices such as smartphones, digital cameras, notebook computers, navigation devices, and smart televisions. The display devices may be flat panel display devices such as liquid crystal display devices, field emission display devices, and organic light emitting display devices. Among these flat panel display devices, a light emitting display device generally includes a light emitting element that enables each pixel of a display panel to emit light by itself. Thus, the light emitting display device can display an image without using a backlight unit to provide light to the display panel.

Recent display devices include a touch input sensor that may detect an input from a user's body part (e.g., a finger) and a touch input device such as an electronic pen. Since the display devices sense the touch input by using the electronic pen, the touch input sensor of the display devices can sense a touch input from the electronic pen more accurately than when sensing the touch input from the user's body part.

SUMMARY

According to an embodiment of the present invention, a display device includes: a display unit including display pixels and light sensing pixels that are disposed in a preset code pattern shape in an image display area; a touch sensing unit formed on the display unit and configured to detect a touch position of a user; and a color filter layer disposed on the display pixels and the light sensing pixels, wherein the display pixels and the light sensing pixels are disposed in combination with each other in the preset code pattern shape to form code patterns for detecting position coordinates of a position input device.

In an embodiment of the present invention, the image display area includes: code pattern placement areas defined in advance to place the code patterns according to positions where the code patterns are placed; and unit pixels disposed in each of the code pattern placement areas, wherein each of the unit pixels includes a portion of display pixels and at least one light sensing pixel of the light sensing pixels, wherein the unit pixels are arranged in a preset code pattern shape in each of the code pattern placement areas, and the code patterns comprise a position code detection pattern sensed by the position input device.

In an embodiment of the present invention, the light sensing pixels respectively included in the unit pixels have light sensing units of a same size as each other or different sizes from each other, respectively, and sense and receive different amounts of light according to the sizes of the light sensing units.

In an embodiment of the present invention, at least one first unit pixel among the unit pixels includes a first light sensing pixel including a first light sensing unit of a first area, a first display pixel, a second display pixel and a third display pixel, and at least one second unit pixel among the unit pixels includes a second light sensing pixel including a second light sensing unit of a second area, a first display pixel, a second display pixel and a third display pixel, wherein the first area is larger and/or wider than the second area.

In an embodiment of the present invention, each of the code pattern placement areas includes: a first unit pixel including one first light sensing pixel, which includes a first light sensing unit of a first area, and first through third display pixels; and three second unit pixels, each including a second light sensing pixel, which includes a second light sensing unit of a second area smaller than the first area, and first through third display pixels.

In an embodiment of the present invention, the first unit pixel and the three second unit pixels are arranged in a 2×2 structure in at least one first code pattern placement area among the code pattern placement areas, wherein the first unit pixel and a first second unit pixel of the three second unit pixels are disposed side by side in a first direction, wherein a second second unit pixel of the three second unit pixels and the first unit pixel are disposed side by side in a second direction which is perpendicular to the first direction, and wherein a third second unit pixel of the three second unit pixels is disposed side by side with the second second unit pixel in the first direction and the first second unit pixel in the second direction, so that a preset "00" code pattern is formed according to the arrangement form of the first unit pixel and the three second unit pixels.

In an embodiment of the present invention, the one first unit pixel and the three second unit pixels are arranged in a 2×2 structure in at least one first code pattern placement area among the code pattern placement areas, wherein a first second unit pixel and a second second unit pixel among the three second unit pixels are disposed side by side in a second direction, wherein the first unit pixel is disposed side by side with the first second unit pixel in a first direction which is perpendicular to the second direction, and a third second unit pixel of the three second unit pixels is disposed side by side with the first unit pixel in the second direction and disposed side by side with the second second unit pixel in the first direction, so that a preset "01" code pattern is formed according to the arrangement form of the first unit pixel and the three second unit pixels.

In an embodiment of the present invention, the one first unit pixel and the three second unit pixels are arranged in a 2×2 structure in at least one first code pattern placement area among the code pattern placement areas, wherein a first second unit pixel among the three second unit pixels and the first unit pixel are disposed side by side in a second direction, wherein a second second unit pixel of the three second unit pixels is disposed side by side with the first second unit pixel in a first direction which is perpendicular to the second direction, and a third second unit pixel of the three second unit pixels is disposed side by side with the first unit pixel in the first direction and disposed side by side with the second second unit pixel in the second direction, so that a preset "10" code pattern is formed according to the arrangement form of the first unit pixel and the three second unit pixels.

In an embodiment of the present invention, the first unit pixel and the three second unit pixels are arranged in a 2×2 structure in at least one first code pattern placement area among the code pattern placement areas, wherein a first second unit pixel and a second second unit pixel among the three second unit pixels are disposed side by side in a first direction, wherein a third second unit pixel of the three second unit pixels is disposed side by side with the first second unit pixel in a second direction which is perpendicular to the first direction, and the first unit pixel is disposed side by side with the second second unit pixel in the second direction, so that a preset "11" code pattern is formed according to the arrangement form of the first unit pixel and the three second unit pixels.

In an embodiment of the present invention, the first light sensing unit of the first light sensing pixel is formed to be larger and/or wider than each of the second light sensing unit of the second light sensing pixel and first through third light emitting units of the first through third display pixels, and wherein the second light sensing unit of the second light sensing pixel is formed to be smaller and/or narrower than the first light sensing unit of the first light sensing pixel and larger and/or wider than the first through third light emitting units of the first through third display pixels.

In an embodiment of the present invention, the color filter layer includes: a plurality of first color filters disposed on the first light sensing unit and the second light sensing unit to allow light of a preset visible light wavelength band to pass therethrough; and a plurality of second color filters disposed on the first through third light emitting units to allow light of a preset visible light wavelength band to pass therethrough, wherein the first color filters are formed to be larger and thicker than the second color filters.

According to an embodiment of the present invention, a position input system includes: a display device displaying an image; and a position input device inputting position coordinate data to the display device, wherein the display device includes: a display unit including display pixels and light sensing pixels that are disposed in a preset code pattern shape in an image display area; a touch sensing unit formed on the display unit and configured to detect a touch position of a user; and a color filter layer disposed on the display pixels and the light sensing pixels, wherein the display pixels and the light sensing pixels are disposed in combination with each other in the preset code pattern shape to form code patterns for detecting position coordinates of the position input device.

In an embodiment of the present invention, the image display area includes: code pattern placement areas defined in advance to place the code patterns according to positions where the code patterns are placed; and unit pixels disposed in each of the code pattern placement areas, wherein each of the unit pixels includes a plurality of display pixels and at least one light sensing pixel, wherein the unit pixels are arranged in a preset code pattern shape in each of the code pattern placement areas, and the code patterns comprise a position code detection pattern sensed by the position input device.

In an embodiment of the present invention, each of the code pattern placement areas includes: a first unit pixel including one first light sensing pixel, which includes a first light sensing unit of a first area, and first through third display pixels; and three second unit pixels, each including a second light sensing pixel, which includes a second light sensing unit of a second area that is smaller than the first area, and first through third display pixels.

In an embodiment of the present invention, the first light sensing unit of the first light sensing pixel is formed to be larger and/or wider than each of the second light sensing unit of the second light sensing pixel and first through third light emitting units of the first through third display pixels, and the second light sensing unit of the second light sensing pixel is formed to be smaller and/or narrower than the first light sensing unit of the first light sensing pixel and larger and/or wider than the first through third light emitting units of the first through third display pixels.

In an embodiment of the present invention, the color filter layer includes: a plurality of first color filters disposed on the first light sensing unit and the second light sensing unit to allow light of a preset visible light wavelength band to pass therethrough; and a plurality of second color filters disposed on the first through third light emitting units to allow light of a preset visible light wavelength band to pass therethrough, wherein the first color filters are formed to be larger and thicker than the second color filters.

According to an embodiment of the present invention, an electronic device includes: a display device including: a display unit including a plurality of display pixels and a plurality of light sensing pixels that are disposed in a preset code pattern shape in an image display area; and a touch sensing unit formed on the display unit and configured to detect a touch position of a user, wherein the plurality of display pixels and the plurality of light sensing pixels are disposed in combination with each other in the preset code pattern shape to form code patterns for detecting position coordinates of a position input device, wherein the image display area includes code placement areas in which unit pixels are disposed, and each code placement area has a different arrangement of unit pixels from each other, wherein each of the unit pixels includes a portion of the plurality display pixels and a light sensing pixel of the plurality of light sensing pixels.

In an embodiment of the present invention, the light sensing pixels respectively included in the unit pixels have light sensing units of a same size as each other or different sizes from each other.

In an embodiment of the present invention, the electronic device further includes a color filter layer disposed on the plurality of display pixels and the plurality of light sensing pixels.

In an embodiment of the present invention, a first unit pixel among the unit pixels includes a first light sensing pixel including a first light sensing unit of a first area, a first display pixel, a second display pixel and a third display pixel, wherein the first light sensing unit is larger than each of first through third light emitting units of the first through third display pixels.

BRIEF DESCRIPTION OF THE DRAWINGS

The above and other aspects and features of the present invention will become more apparent by describing in detail embodiments thereof with reference to the attached drawings, in which.

DETAILED DESCRIPTION OF THE EMBODIMENTS

Features of the present invention will now be described more fully hereinafter with reference to the accompanying drawings, in which embodiments of the present invention are shown. This disclosure may, however, be embodied in different forms and should not be construed as limited to the embodiments set forth herein.

It will also be understood that when a layer is referred to as being "on" another layer or substrate, it can be directly on the other layer or substrate, or intervening layers may also be present. The same reference numbers indicate the same components throughout the specification and drawings, and thus, redundant descriptions may be omitted or briefly discussed.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Each of the features of the various embodiments of the present invention may be partially combined or entirely combined with each other, and technically, various interlocking, interworking, and driving are possible. Each embodiment may be implemented independently of each other or may be implemented together in an association with each other.

Hereinafter, embodiments of the present invention will be described with reference to the attached drawings.

Embodiments of the present invention may relate to a display device that may form code patterns for detecting position coordinates of a position input device by changing the arrangement structure of image display pixels and light sensing pixels having light sensing units of different sizes from each other on a display panel of the display device. Further, embodiments of the present invention may relate to a position input system including the display device.

Figure 1:
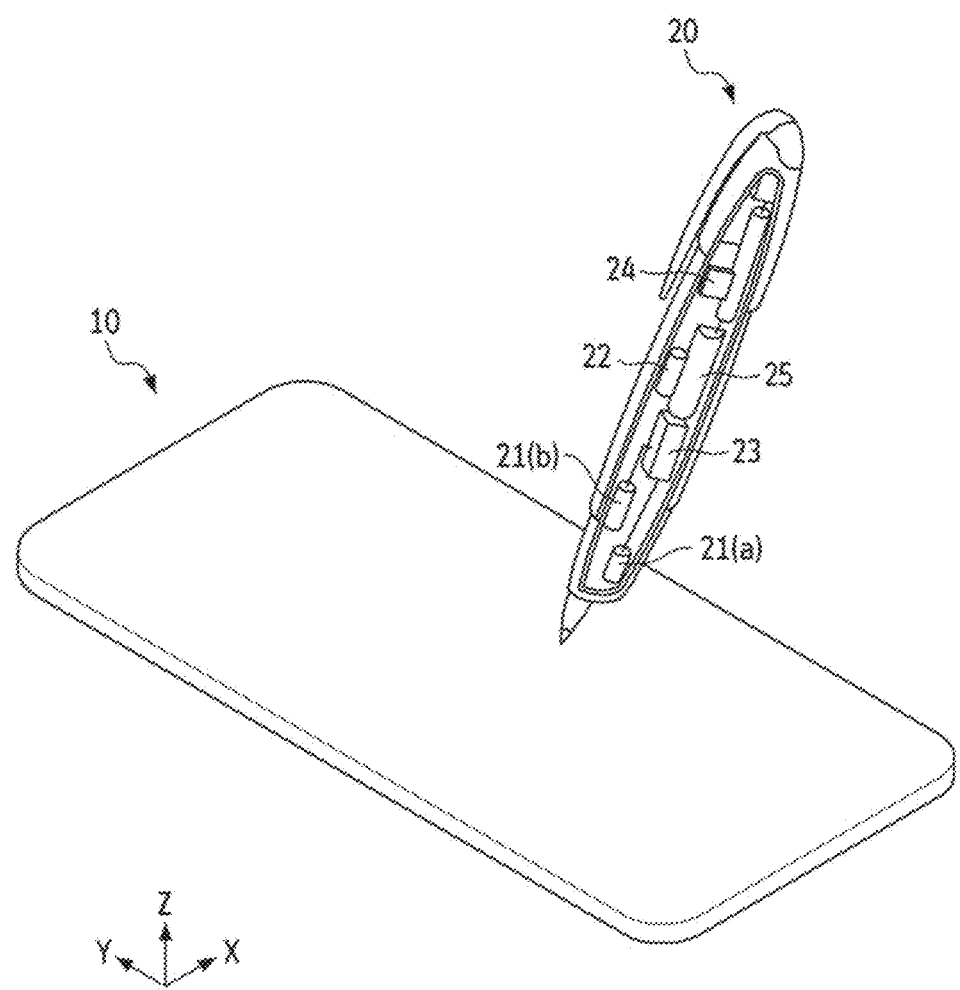
FIG. 1 is a configuration diagram of a position input system according to an embodiment of the present invention.
Figure 2:
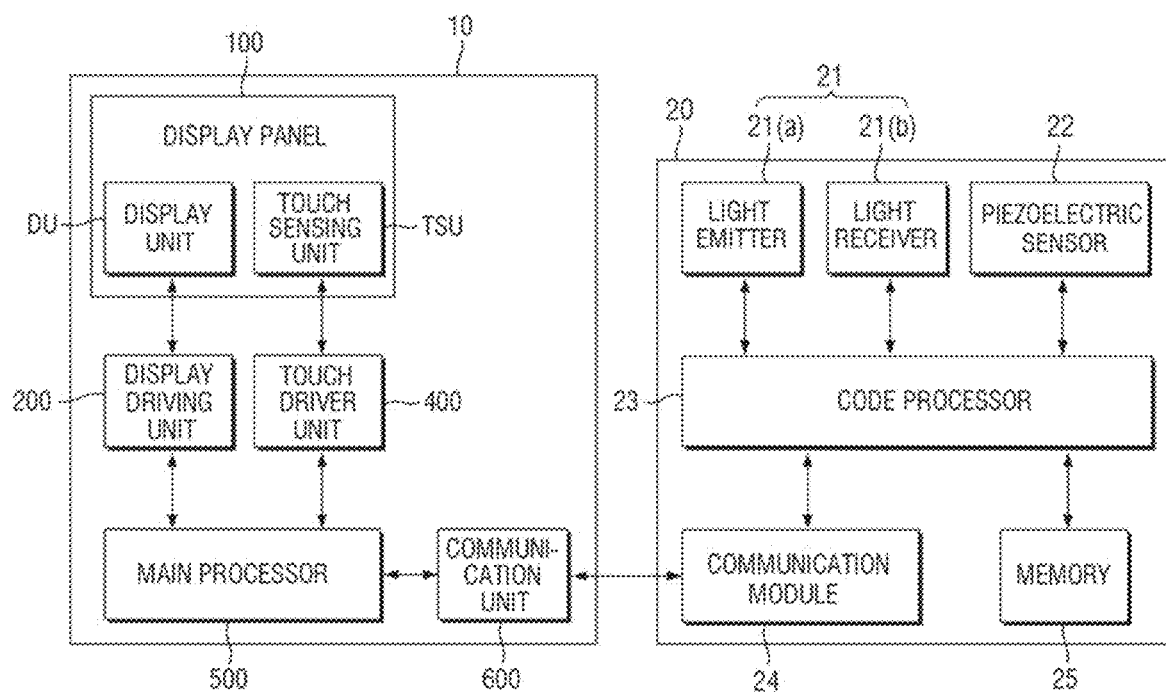
FIG. 2 is a configuration block diagram of a position input device and a display device illustrated in FIG. 1.

FIG. 1 is a configuration diagram of a position input system according to an embodiment of the present invention. FIG. 2 is a detailed configuration block diagram of a position input device 20 and a display device 10 illustrated in FIG. 1.

Referring to FIGS. 1 and 2, the display device 10 may be applied to or incorporated into electronic devices such as smartphones, tablet personal computers (PCs), electronic notebooks, electronic books, portable multimedia players (PMPs), mobile phones, mobile communication terminals, navigation devices, and ultra-mobile PCs (UMPCs). In addition, the display device 10 may be applied to or incorporated into wearable electronic devices such as smart watches, watch phones, glasses-type displays, and head-mounted displays (HMDs). In addition, the display device 10 may be applied as a display unit for electronic devices such as a television, a notebook computer, a monitor, a billboard, or an Internet of things (IoT) device.

The display device 10 includes a display panel 100, a display driver 200, a touch driver 400, a main processor 500, and a communication unit 600. In addition, the position input device 20 includes a code detector 21, a piezoelectric sensor 22, a code processor 23, a communication module 24, and a memory 25.

The display device 10 uses the position input device 20 as a touch input mechanism. The display panel 100 of the display device 10 may include a display unit DU, which displays an image, and a touch sensing unit TSU, which senses a touch input from a body part such as a finger and the position input device 20.

The display unit DU of the display panel 100 may include a plurality of image display pixels (hereinafter, referred to as display pixels) and a plurality of light sensing pixels and may display an image through the pixels. The display unit DU may detect light sensing signals through the light sensing pixels and may measure a user's biometric information such as a fingerprint and a pulse signal.

In the display unit DU of the display panel 100 according to an embodiment of the present invention, preset display pixels and light sensing pixels are disposed according to a preset code pattern shape to form code patterns for detecting position coordinates of the position input device 20.

For example, in an image display area of the display unit DU, code pattern placement areas are defined and preset according to preset positions. In addition, in each of the code pattern placement areas, a plurality of display pixels and at least one light sensing pixel having a light sensing unit of a different size are disposed to form each unit pixel. Here, in each code pattern placement area, a plurality of unit pixels are arranged according to a preset code pattern shape, that is, a code pattern shape for detecting the position coordinates of the position input device 20. For example, code patterns formed by a plurality of unit pixels are position code detection patterns sensed by the position input device 20.

Display pixels included in the unit pixels of the code pattern placement areas may all display an image. In addition, light sensing pixels respectively included in the unit pixels receive light from a front side and sense the amount of received light. The light sensing pixels respectively included in the unit pixels have light sensing units of the same size or different sizes. Therefore, the light sensing pixels may sense and receive different amounts of light according to the sizes of the light sensing units.

Since each code pattern is formed by unit pixels, each composed of a plurality of display pixels and at least one light sensing pixel, each code pattern may be disposed on a front surface of the display unit DU or may be integrally built into the display unit DU.

The detailed structure of the display panel 100 in which each code pattern is formed by unit pixels and the arrangement form or embedded structure of the unit pixels will be described in detail later with reference to the attached drawings.

The touch sensing unit TSU may be formed or disposed on a front surface of the display panel 100. The touch sensing unit TSU may include a plurality of touch electrodes to sense a touch of a user's body part in a capacitive manner.

The display driver 200 may output signals and voltages for driving the display unit DU. The display driver 200 may supply data voltages to data lines. The display driver 200 may supply a power supply voltage to a power line and supply gate control signals to a gate driver.

The touch driver 400 may be connected to the touch sensing unit TSU. The touch driver 400 may supply a touch driving signal to a plurality of touch electrodes of the touch sensing unit TSU and sense a change in capacitance between the touch electrodes. The touch driver 400 may calculate whether a user's touch input has occurred and calculate touch coordinates based on the change in capacitance between the touch electrodes.

The main processor 500 may control all functions of the display device 10. For example, the main processor 500 may supply digital video data to the display driver 200 so that the display panel 100 displays an image. For example, the main processor 500 may receive touch data from the touch driver 400, determine touch coordinates of a user, and then generate digital video data according to the touch coordinates or execute an application indicated by an icon displayed at the touch coordinates of the user. For another example, the main processor 500 may receive coordinate data from the position input device 20, determine touch coordinates of the position input device 20, and then generate digital video data according to the touch coordinates or execute an application indicated by an icon displayed at the touch coordinates of the position input device 20.

The communication unit 600 (e.g., communication circuit) may perform wired or wireless communication with an external device. For example, the communication unit 600 may transmit and receive communication signals to and from the communication module 24 of the position input device 20. The communication unit 600 may receive coordinate data composed of data codes from the position input device 20 and provide the coordinate data to the main processor 500.

The position input device 20 may be used as a touch input mechanism and may be configured as an electronic pen such as a smart pen. The position input device 20 may be an electronic pen that senses display light of the display panel 100 or light reflected from the display panel 100 by using an optical method and may detect code patterns that are included in the display panel 100 based on the sensed light and generate coordinate data. The position input device 20 may be an electronic pen in the shape of a writing instrument, but the present invention is not limited to a simple writing instrument shape or structure.

The code detector 21 of the position input device 20 is disposed at a position adjacent to a pen tip portion of the position input device 20 and detects code patterns formed by unit pixels of the display panel 100. To this end, the code detector 21 includes at least one light emitting unit 21(*a*), which emits infrared light using at least one infrared light source, and at least one light receiving unit 21(*b*), which detects infrared light reflected from code patterns using an infrared camera.

At least one infrared light source included in the light emitting unit 21(*a*) may be configured as an infrared light emitting diode (LED) array having a matrix structure. In addition, the infrared camera of the light receiving unit 21(*b*) may include a filter which blocks wavelength bands other than infrared light and allows infrared light to pass therethrough. The infrared light emitting diode (LED) may include a lens system, which focuses infrared light passing through the filter, and an optical image sensor, which converts an optical image formed by the lens system into an electrical image signal and outputs the electrical image signal. The optical image sensor may be configured as an array having a matrix structure, like the infrared LED array, to provide shape data of code patterns to the code processor 23 according to the shape and amount of light reflected from the touch electrodes, the pixels, and the code patterns. In this way, the code detector 21 of the position input device 20 may continuously detect code patterns according to a user's control and motion, continuously generate shape data of the code patterns, and provide the generated shape data to the code processor 23.

The code processor 23 may continuously receive shape data of code patterns from the code detector 21. The code processor 23 continuously receives the shape data of the code patterns and extracts or generates coordinate data by identifying shapes and placement structures of the code patterns. For example, when the shape data of the code patterns is received, the code processor 23 forms virtual grid reference lines that are orthogonal to each other. Then, it matches intersection points where the grid reference lines are orthogonal to and intersect each other with positions and shape data of the code patterns and extracts touch position coordinates and coordinate data based on the results of comparing the positions and shapes of the code patterns with the grid reference lines. The code processor 23 transmits the coordinate data that includes the touch position coordinates to the display device 10 through the communication module 24. In this way, the code processor 23 may rapidly generate coordinate data in real time without complex calculations and corrections by continuously generating touch position coordinates and coordinate data corresponding to positions and shapes of code patterns.

The piezoelectric sensor 22 senses a pressing force applied to any one surface of the position input device 20 by a user. The piezoelectric sensor 22 generates an enable signal during a period in which the pressing force is sensed and transmits the enable signal to the code processor 23 and the communication module 24 (e.g., a communication circuit). The code processor 23 and the communication module 24 may be enabled according to the enable signal from the piezoelectric sensor 22. In addition, the piezoelectric sensor 22 may transmit a disable signal to the code processor 23 and the communication module 24 during a disable period in which the pressing force is not sensed.

The communication module 24 may perform wired or wireless communication with an external device. For example, the communication module 24 may transmit and receive communication signals to and from the communication unit 600 of the display device 10. The communication module 24 may receive coordinate data including touch position coordinates from the code processor 23 and provide the coordinate data to the communication unit 600.

The memory 25 may store data for driving the position input device 20. The memory 25 stores touch position coordinates and coordinate data corresponding to the positions, shape images and shape data of code patterns. The memory 25 shares the touch position coordinates and coordinate data corresponding to the positions, shape images, or shape data of the code patterns with the code processor 23.

Figure 3:
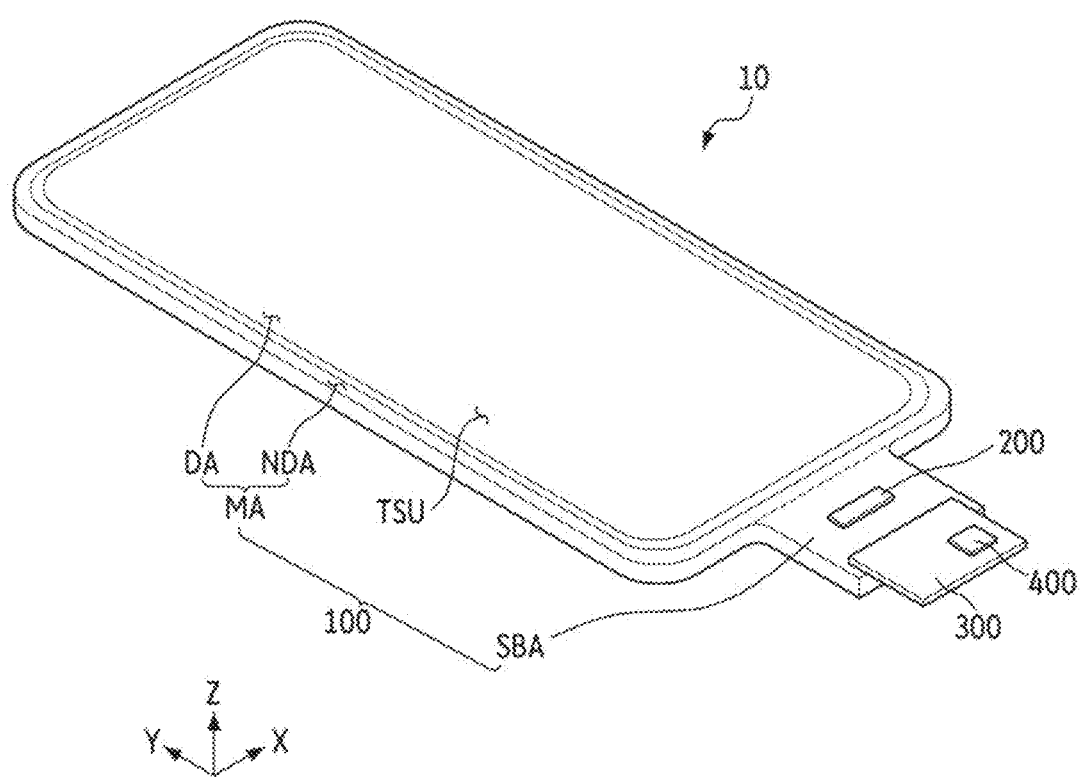
FIG. 3 is a perspective view of the display device illustrated in FIG. 2.
Figure 4:
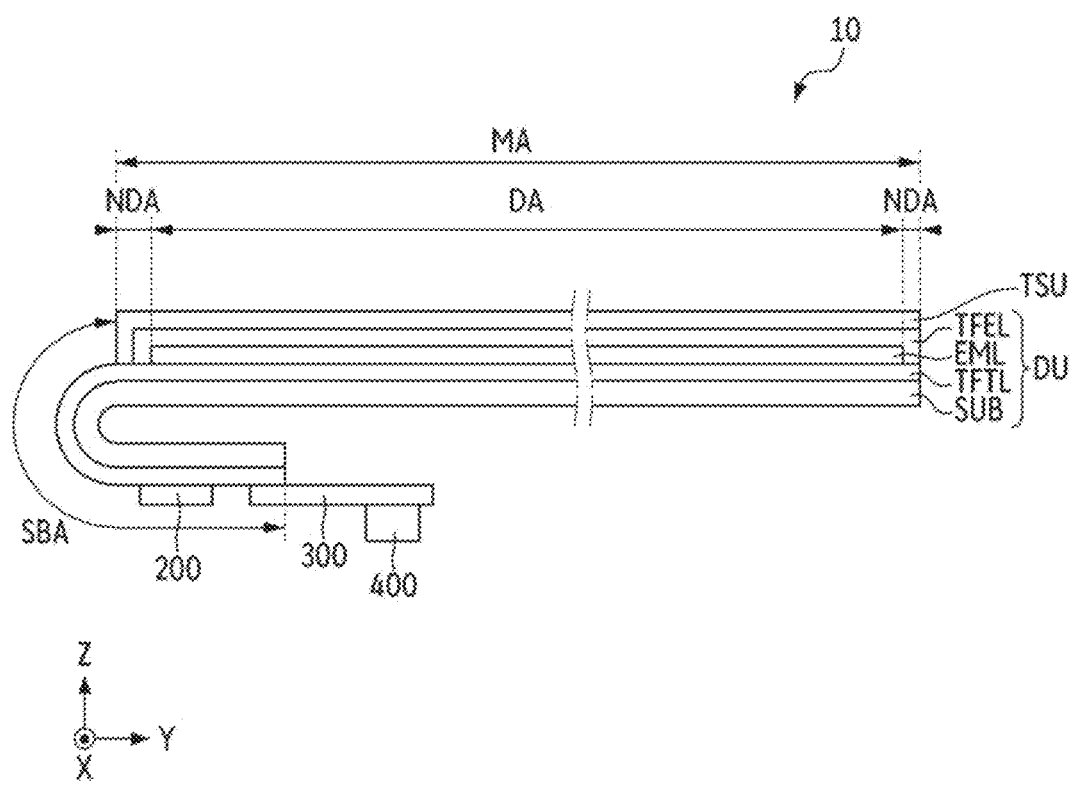
FIG. 4 is a cross-sectional view of the display device illustrated in FIG. 2.

FIG. 3 is a perspective view of the display device 10 illustrated in FIG. 2. FIG. 4 is a detailed cross-sectional view of the display device 10 illustrated in FIG. 2.

The display device 10 may have a planar shape similar to a quadrangle. For example, the display device 10 may have a planar shape similar to a quadrangle having short sides in an X-axis direction and long sides in a Y-axis direction. Each corner, of the planar shape, where a short side extending in the X-axis direction meets a long side extending in the Y-axis direction may be rounded to have a predetermined curvature or may be right-angled. The planar shape of the display device 10 is not limited to the quadrangular shape but may also be similar to other polygonal shapes, a circular shape, or an oval shape.

The display panel 100 may include a main area MA and a sub-area SBA.

The main area MA may include a display area DA and a non-display area NDA. The display area DA includes pixels that display an image, and the non-display area NDA is disposed around or adjacent to the display area DA. The display area DA may emit light from a plurality of emission areas or a plurality of opening areas. For example, the display panel 100 may include a pixel circuit including switching elements, a pixel defining layer defining an emission area or an opening area, and a self-light emitting element.

The non-display area NDA may be an area that is outside of the display area DA. The non-display area NDA may be an edge area of the main area MA of the display panel 100. The non-display area NDA may include a gate driver, which supplies gate signals to gate lines, and fan-out lines, which connect to the display driver 200 and the display area DA.

The sub-area SBA may extend from a side of the main area MA. The sub-area SBA may include a flexible material that can be bent, folded, rolled, etc. For example, when the sub-area SBA is bent, it may overlap with the main area MA in a thickness direction (Z-axis direction). The sub-area SBA may include the display driver 200 and a pad unit connected to a circuit board 300. In an embodiment of the present inventive concept, the sub-area SBA may be omitted, and the display driver 200 and the pad unit may be disposed in the non-display area NDA.

The display driver 200 may be formed as an integrated circuit and mounted on the display panel 100 by a chip on glass (COG) method, a chip on plastic (COP) method, or an ultrasonic bonding method. For example, the display driver 200 may be disposed in the sub-area SBA and may overlap with the main area MA in the thickness direction (Z-axis direction) by the bending of the sub-area SBA. For another example, the display driver 200 may be mounted on the circuit board 300.

The circuit board 300 may be attached onto the pad unit of the display panel 100 using an anisotropic conductive layer. Lead lines of the circuit board 300 may be electrically connected to the pad unit of the display panel 100. The circuit board 300 may be a flexible printed circuit board, a printed circuit board, or a flexible film such as a chip on film.

The touch driver 400 may be mounted on the circuit board 300. The touch driver 400 may be formed as an integrated circuit. As described above, the touch driver 400 may supply a touch driving signal to a plurality of touch electrodes of the touch sensing unit TSU and sense a change in capacitance between the touch electrodes. Here, the touch driving signal may be a pulse signal having a predetermined frequency. The touch driver 400 may calculate whether a touch input of a user's body part such as a finger has occurred and may determine touch coordinates based on the change in capacitance between the touch electrodes.

Referring to FIG. 4, the display unit DU of the display panel 100 may include a substrate SUB, a thin-film transistor layer TFTL, a light emitting element layer EML, and an encapsulation layer TFEL.

The substrate SUB may be a base substrate or a base member. The substrate SUB may be a flexible substrate that can be bent, folded, rolled, etc. For example, the substrate SUB may include a glass material or a metal material, but the present disclosure is not limited thereto.

The thin-film transistor layer TFTL may be disposed on the substrate SUB. The thin-film transistor layer TFTL may include a plurality of thin-film transistors constituting a pixel circuit of each pixel. The thin-film transistor layer TFTL may further include gate lines, data lines, power lines, gate control lines, fan-out lines connecting the display driver 200 and the data lines, and lead lines connecting the display driver 200 and the pad unit. When the gate driver is disposed on a side of the non-display area NDA of the display panel 100, it may also include thin-film transistors.

The thin-film transistor layer TFTL may be disposed in the display area DA, the non-display area NDA, and the sub-area SBA. The thin-film transistors of each pixel, the gate lines, the data lines, and the power lines of the thin-film transistor layer TFTL may be disposed in the display area DA. The gate control lines and the fan-out lines of the thin-film transistor layer TFTL may be disposed in the non-display area NDA. The lead lines of the thin-film transistor layer TFTL may be disposed in the sub-area SBA.

The light emitting element layer EML may be disposed on the thin-film transistor layer TFTL. The light emitting element layer EML may include a plurality of light emitting elements, each including a first electrode, a light emitting layer and a second electrode sequentially stacked to emit light, and a pixel defining layer defining the pixels. In addition, the light emitting element layer EML further includes light sensing elements, each including a first electrode, an organic/inorganic material layer and a second electrode sequentially stacked to receive light and sense the amount of light in a photodiode structure.

The light emitting elements and the light sensing elements of the light emitting element layer EML may be disposed in the display area DA. The light emitting layer may be an organic light emitting layer including an organic material. The light emitting layer may include a hole transporting layer, an organic light emitting layer, and an electron transporting layer. When the first electrode receives a predetermined voltage through a thin-film transistor of the thin-film transistor layer TFTL and the second electrode receives a cathode voltage, holes and electrons may move to the organic light emitting layer through the hole transporting layer and the electron transporting layer, respectively, and may be combined with each other in the organic light emitting layer to emit light. For example, the first electrode may be an anode, and the second electrode may be a cathode, but the present invention is not limited thereto.

In addition, the light sensing elements of the light emitting element layer EML may be formed in a photodiode structure including an organic/inorganic material layer to receive light incident on their front surface and generate an electrical signal, i.e., a light sensing signal, according to the amount of light sensed.

The encapsulation layer TFEL may cover upper and side surfaces of the light emitting element layer EML and may protect the light emitting element layer EML. The encapsulation layer TFEL may include at least one inorganic layer and at least one organic layer to encapsulate the light emitting element layer EML.

The touch sensing unit TSU may be disposed on the encapsulation layer TFEL. The touch sensing unit TSU may include a plurality of touch electrodes, which are for sensing a user's touch in a capacitive manner, and touch lines, which connect the touch electrodes and the touch driver 400 to each other. For example, the touch sensing unit TSU may sense a user's touch in a mutual capacitance manner or a self-capacitance manner.

For another example, the touch sensing unit TSU may be disposed on a separate substrate that is disposed on the display unit DU. In this case, the substrate that supports the touch sensing unit TSU may be a base member that encapsulates the display unit DU.

The touch electrodes of the touch sensing unit TSU may be disposed in a touch sensor area overlapping the display area DA. The touch lines of the touch sensing unit TSU may be disposed in a touch peripheral area overlapping the non-display area NDA.

The sub-area SBA of the display panel 100 may extend from a side of the main area MA. The sub-area SBA may include a flexible material that can be bent, folded, rolled, etc. For example, when the sub-area SBA is bent, it may overlap with the main area MA in the thickness direction (Z-axis direction). The sub-area SBA may include the display driver 200 and the pad unit that is connected to the circuit board 300.

Figure 5:
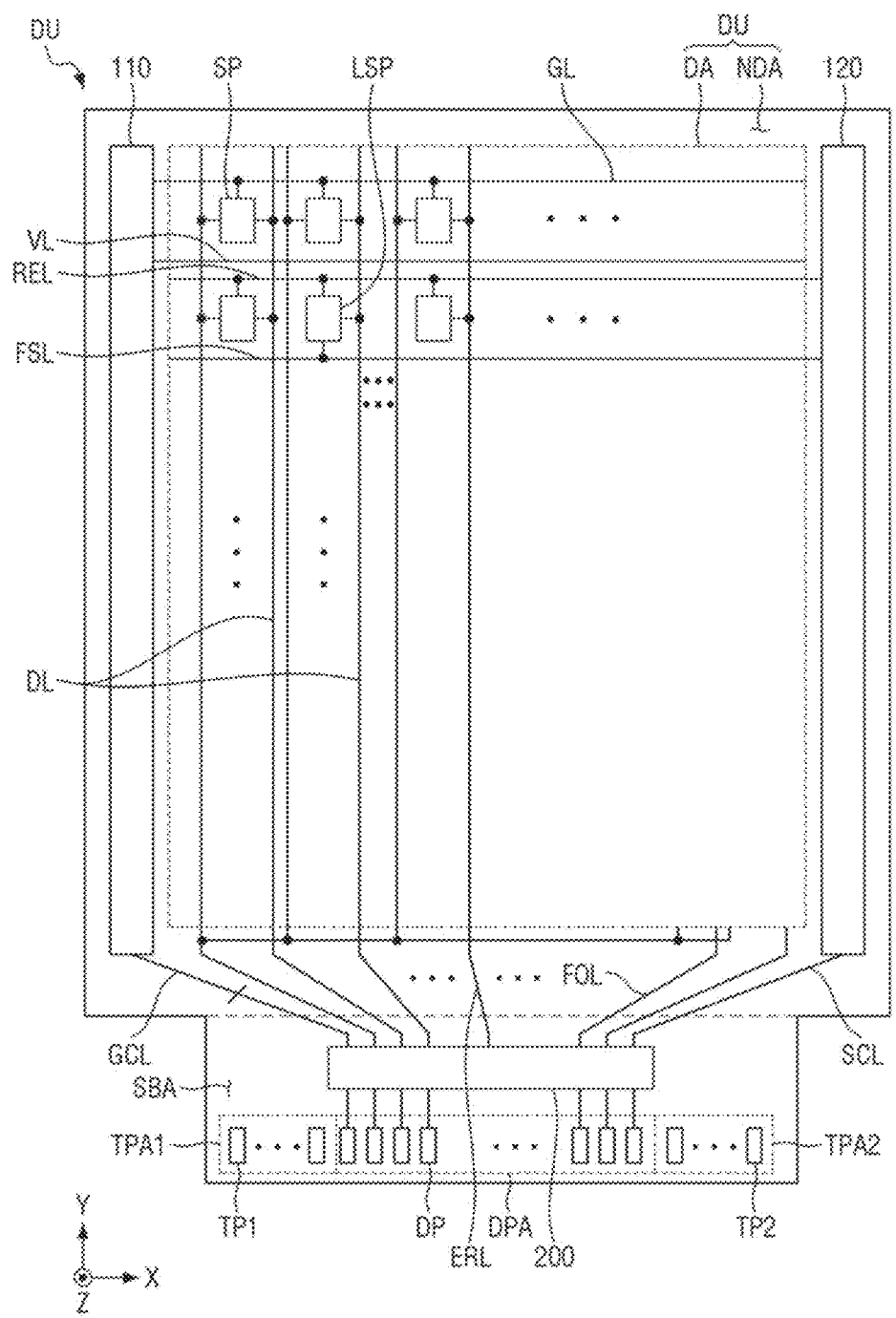
FIG. 5 is a schematic layout view of an example of a display panel illustrated in FIGS. 1 through 4.

FIG. 5 is a schematic layout view of an example of the display panel 100 illustrated in FIGS. 1 through 4. Specifically, FIG. 5 is a layout view illustrating the display area DA and the non-display area NDA of the display unit DU before the touch sensing unit TSU is formed.

Referring to FIG. 5 together with FIGS. 3 and 4, a display scan driver 110, a light sensing scan driver 120, and the main processor 200 may be disposed on the display panel 100 of the display device 10 according to an embodiment of the present inventive concept. In addition, the touch driver 400 and a power supply unit may be disposed on the circuit board 300 connected to the display panel 100. Here, both the main processor 200 and the touch driver 400 may be integrally formed as a 1-chip type and mounted on the display panel 100 or the circuit board 300. However, for ease of functional description, an example in which the main processor 500 and the touch driver 400 are formed as different integrated circuits will be described below.

Referring to FIG. 5, the display panel 100 may include display pixels SP, light sensing pixels LSP, display scan lines GL, emission control lines VL, data lines DL, light sensing scan lines FSL, sensing reset lines REL, and light sensing lines ERL disposed in the display area DA. The display scan driver 110 and the light sensing scan driver 120 are disposed in the non-display area NDA.

The display scan lines GL sequentially supply display scan signals, which are received from the display scan driver 110 on a horizontal line-by-horizontal line basis, to the display pixels SP and the light sensing pixels LSP for each horizontal line. The display scan lines GL may extend in a first direction (X-axis direction) and may be spaced apart from each other in a second direction (Y-axis direction) intersecting the first direction (X-axis direction).

The emission control lines VL sequentially supply emission control signals, which are received from the display scan driver 110 on a horizontal line-by-horizontal line basis, to the display pixels SP and the light sensing pixels LSP for each horizontal line. The emission control lines VL may extend parallel to the display scan lines GL in the first direction (X-axis direction) and may be spaced apart from each other in the second direction (Y-axis direction) intersecting the first direction (X-axis direction).

The data lines DL may supply data voltages received from the main processor 500 to a plurality of display pixels SP. The data lines DL may extend in the second direction (Y-axis direction) and may be spaced apart from each other in the first direction (X-axis direction).

The light sensing scan lines FSL sequentially supply sensing scan signals, which are received from the light sensing scan driver 120 on a horizontal line-by-horizontal line basis, to a plurality of light sensing pixels LSP. The light sensing scan lines FSL may extend in the first direction (X-axis direction) and may be spaced apart from each other in the second direction (Y-axis direction) intersecting the first direction (X-axis direction).

The sensing reset lines REL sequentially supply sensing reset signals, which are received from the light sensing scan driver 120 on a horizontal line-by-horizontal line basis, to a plurality of light sensing pixels LSP for each horizontal line. The sensing reset lines REL may extend parallel to the light sensing scan lines FSL in the first direction (X-axis direction) and may be spaced apart from each other in the second direction (Y-axis direction) intersecting the first direction (X-axis direction).

The light sensing lines ERL are connected between the light sensing pixels LSP and the main processor 500 to supply light sensing signals, which are respectively output from the light sensing pixel LSP, to the main processor 500. The light sensing lines ERL may lie and extend in the second direction (Y-axis direction) according to the position in which the main processor 500 is disposed and may be spaced apart from each other in the first direction (X-axis direction).

The non-display area NDA may at least partially surround the display area DA. The non-display area NDA may include the display scan driver 110, the light sensing scan driver 120, fan-out lines FOL, gate control lines GCL, and light sensing control lines SCL.

A plurality of display pixels SP and one light sensing pixel LSP may form a first unit pixel, and the first unit pixels may be arranged in a matrix form in the first direction (X-axis direction) and the second direction (Y-axis direction) in the display area DA. In addition, a plurality of display pixels SP and one light sensing pixel LSP may form a second unit pixel, and the second unit pixels may be arranged alternately with the first unit pixels in a matrix form in the display area DA.

For example, three display pixels SP, which respectively display red light, green light and blue light, and one light sensing pixel LSP may form each first unit pixel of the plurality of first unit pixels. In addition, three display pixels SP, which respectively display red light, green light and blue light, and one other light sensing pixel LSP may form each second unit pixel. The first unit pixels and the second unit pixels may be arranged in a matrix form by alternating the first and second unit pixels in a horizontal or vertical stripe form. In addition, the first unit pixels and the second unit pixels may be alternately arranged in a zigzag form in plan view and may be arranged in a matrix form in any one diagonal direction.

The light sensing pixels LSP may be arranged alternately with the red, green and blue display pixels SP in a vertical or horizontal direction. Each of the light sensing pixels LSP may be connected to one of the light sensing scan lines FSL, one of the sensing reset lines REL, and one of the light sensing lines ERL. Each of the light sensing pixels LSP may be reset in response to a sensing reset signal from a sensing reset line REL and may generate a light sensing signal corresponding to the amount of reflected light that is incident from the front side. In addition, each of the light sensing pixels LSP may transmit the light sensing signal to a light sensing line ERL in response to a sensing scan signal from a light sensing scan line FSL.

The display scan driver 110 may be disposed in the non-display area NDA. Although the display scan driver 110 is illustrated as being disposed on one side (e.g., a left side) of the display panel 100, the present invention is not limited thereto. For example, the display scan driver 110 may also be disposed on both sides (e.g., left and right sides) of the display panel 100.

The display scan driver 110 may be electrically connected to the main processor 500 through the gate control lines GCL. The display scan driver 110 receives a scan control signal from the main processor 500, sequentially generates display scan signals in each horizontal line driving period according to the scan control signal, and sequentially supplies the display scan signals to the display scan lines GL. In addition, the display scan driver 110 may sequentially generate emission control signals according to the scan control signal from the main processor 500 and sequentially supply the emission control signals to the emission control lines VL.

The gate control lines GCL may extend from the main processor 500 to the display scan driver 110 according to the position of the display scan driver 110. The gate control lines GCL may supply scan control signals, which are received from the main processor 500, to the display scan driver 110.

The light sensing scan driver 120 may be disposed in a different part of the non-display area NDA from the display scan driver 110. In FIG. 5, the light sensing scan driver 120 is disposed on the other side (e.g., the right side) of the display panel 100, but the present invention is not limited thereto. The light sensing scan driver 120 may be electrically connected to the main processor 500 through the light sensing control lines SCL. The light sensing scan driver 120 receives a light sensing control signal from the main processor 500 and sequentially generates reset control signals and sensing scan signals in each horizontal line driving period according to the light sensing control signal. Then, the reset control signals generated sequentially are sequentially supplied to the sensing reset lines REL. In addition, the light sensing scan driver 120 may sequentially generate sensing scan signals according to the light sensing control signal from the main processor 500 and sequentially supply the sensing scan signals to the light sensing scan lines FSL.

The light sensing control lines SCL may extend from the main processor 500 to the light sensing scan driver 120 according to the position of the light sensing scan driver 120. The light sensing control lines SCL may supply light sensing control signals, which are received from the main processor 500, to the light sensing scan driver 120.

The sub-area SBA may include the main processor 500, a display pad area DPA, and first and second touch pad areas TPA1 and TPA2. The display pad area DPA, the first touch pad area TPA1, and the second touch pad area TPA2 may be disposed at an edge of the sub-area SBA. The display pad area DPA, the first touch pad area TPA1, and the second touch pad area TPA2 may be electrically connected to the circuit board 300 by using a low-resistance, high-reliability material such as an anisotropic conductive layer or SAP.

The fan-out lines FOL may extend from the main processor 500 to the display area DA. In addition, the fan-out lines FOL are connected to the data lines DL so that data voltages, which are received from the main processor 500, can be supplied to the data lines DL, respectively.

The main processor 500 may output signals and voltages for driving the display panel 100 to the fan-out lines FOL. The main processor 500 may supply data voltages to the data lines DL through the fan-out lines FOL. The data voltages may be supplied to the display pixels SP and may determine luminances of the display pixels SP. The main processor 500 may supply a scan control signal to the display scan driver 110 through a gate control line GCL. The main processor 500 may generate digital video data according to touch coordinates based on touch coordinate data from the touch driver 400 or may execute an application indicated by an icon displayed at coordinates of a user's touch.

Figure 6:
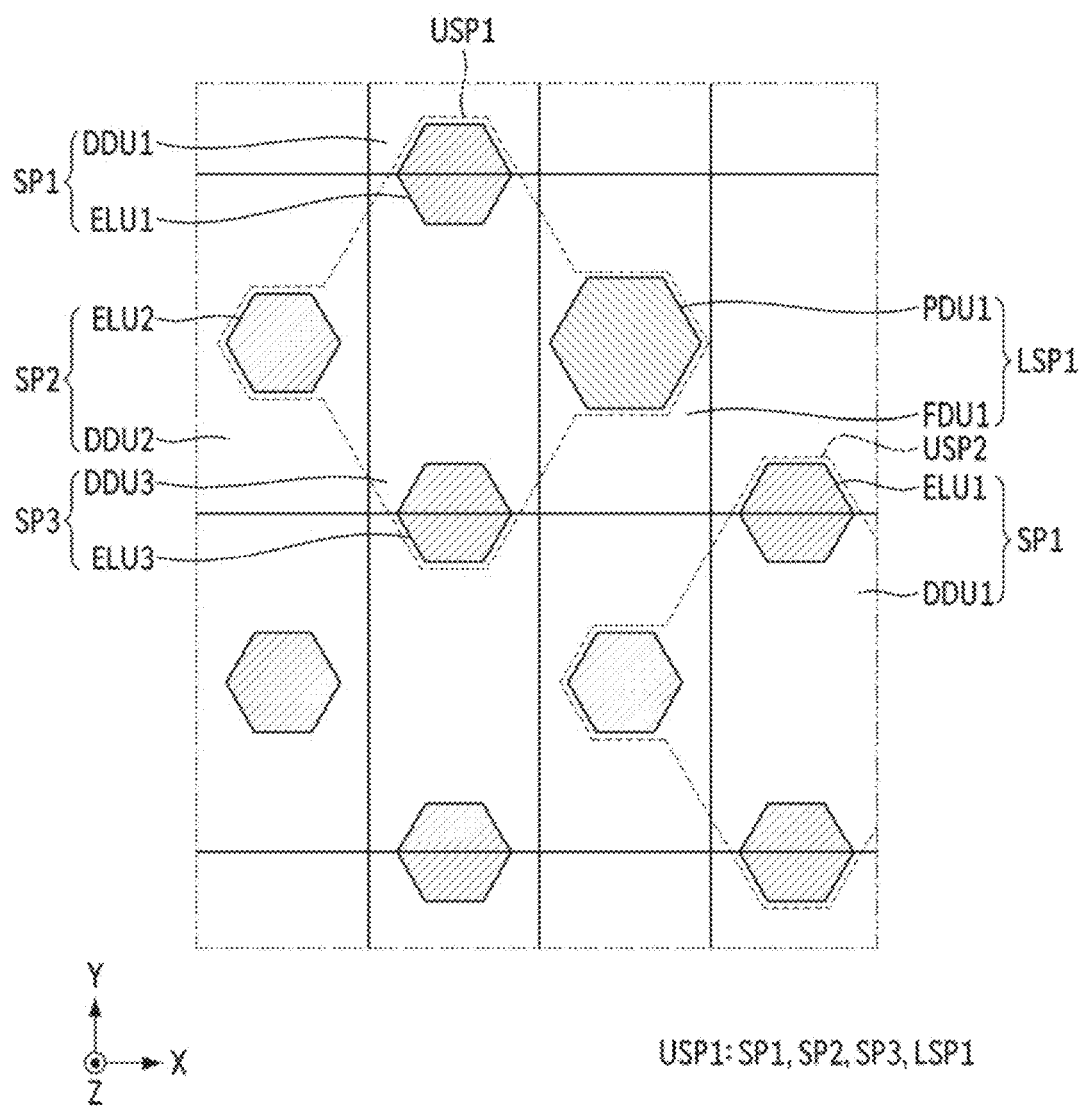
FIG. 6 is a layout view of a display area according to an embodiment of the present invention.

FIG. 6 is a layout view of a display area DA according to an embodiment of the present inventive concept.

Referring to FIG. 6, the display area DA may include display pixels SP and light sensing pixels LSP. Here, the display pixels SP may be divided into first display pixels SP1, second display pixels SP2, and third display pixels SP3.

A first display pixel SP1, a second display pixel SP2, a third display pixel SP3, and a first light sensing pixel LSP1 including a first light sensing unit PDU1 may constitute each first unit pixel USP1.

In addition, a first display pixel SP1, a second display pixel SP2, a third display pixel SP3, and a second light sensing pixel LSP2 including a second light sensing unit may constitute each second unit pixel USP2.

Each of the first and second unit pixels USP1 and USP2 may be a smallest unit of display pixels that can display white. Each of the first and second unit pixels USP1 and USP2 can sense light. The first unit pixels USP1 and the second unit pixels USP2 may be alternately arranged in a zigzag or alternating form in plan view and may be arranged in a matrix form in any one diagonal direction. In addition, the first unit pixels USP1 and the second unit pixels USP2 may be arranged in a matrix form by alternating the first unit pixels USP1 with the second unit pixels USP2 in a horizontal or vertical stripe form in plan view.

A first display pixel SP1 may include a first light emitting unit ELU1 emitting first light and a first pixel driving unit DDU1 for supplying a driving current to a light emitting element of the first light emitting unit ELU1. For example, the first light may be light in a red wavelength band. For example, a main peak wavelength of the first light may be located at about 600 to about 750 nm.

A second display pixel SP2 may include a second light emitting unit ELU2 emitting second light and a second pixel driving unit DDU2 for supplying a driving current to a light emitting element of the second light emitting unit ELU2. For example, second light may be light in a blue wavelength band. For example, a main peak wavelength of the second light may be located at about 370 to about 460 nm.

A third display pixel SP3 may include a third light emitting unit ELU3 emitting third light and a third pixel driving unit DDU3 for supplying a driving current to a light emitting element of the third light emitting unit ELU3. For example, the third light may be light in a green wavelength band. For example, a main peak wavelength of the third light may be located at about 480 to about 560 nm.

A first light sensing pixel LSP1 includes a first light sensing unit PDU1 and a first sensing driving unit FDU1.

In a first unit pixel USP1, the first through third pixel driving units DDU1 through DDU3 may be disposed in a preset order in the first direction (X-axis direction). For example, the first pixel driving unit DDU1 may be disposed adjacent to the third pixel driving unit DDU3 in the second direction (Y-axis direction). In addition, any one of the first through third pixel driving units DDU1 through DDU3 may be disposed in the first direction X-axis direction of another adjacent pixel driving unit. In addition, the first sensing driving unit FDU1 may be disposed in the first direction (X-axis direction) of any one of the first through third pixel driving units DDU1 through DDU3. In addition, the first sensing driving unit FDU1 may be disposed in the second direction (Y-axis direction) of any one of the first through third pixel driving units DDU1 through DDU3.

First pixel driving units DDU1 adjacent to each other in a data line direction may be disposed in the second direction (Y-axis direction). Second pixel driving units DDU2 adjacent to each other in the data line direction may be disposed in the second direction (Y-axis direction). Similarly, sensing driving units FDU adjacent to each other in the data line direction may all be disposed in the second direction (Y-axis direction).

Each of the first light emitting unit ELU1, the second light emitting unit ELU2, the third light emitting unit ELU3, and the first light sensing unit PDU1 may have a polygonal planar shape such as a quadrangle, a hexagon, an octagon, or a rhombus. However, the present inventive concept is not limited thereto. In addition, each of the first light emitting unit ELU1, the second light emitting unit ELU2, the third light emitting unit ELU3, and the first light sensing unit PDU1 may have a polygonal planar shape other than a quadrangle, an octagon, and a rhombus.

Figure 7:
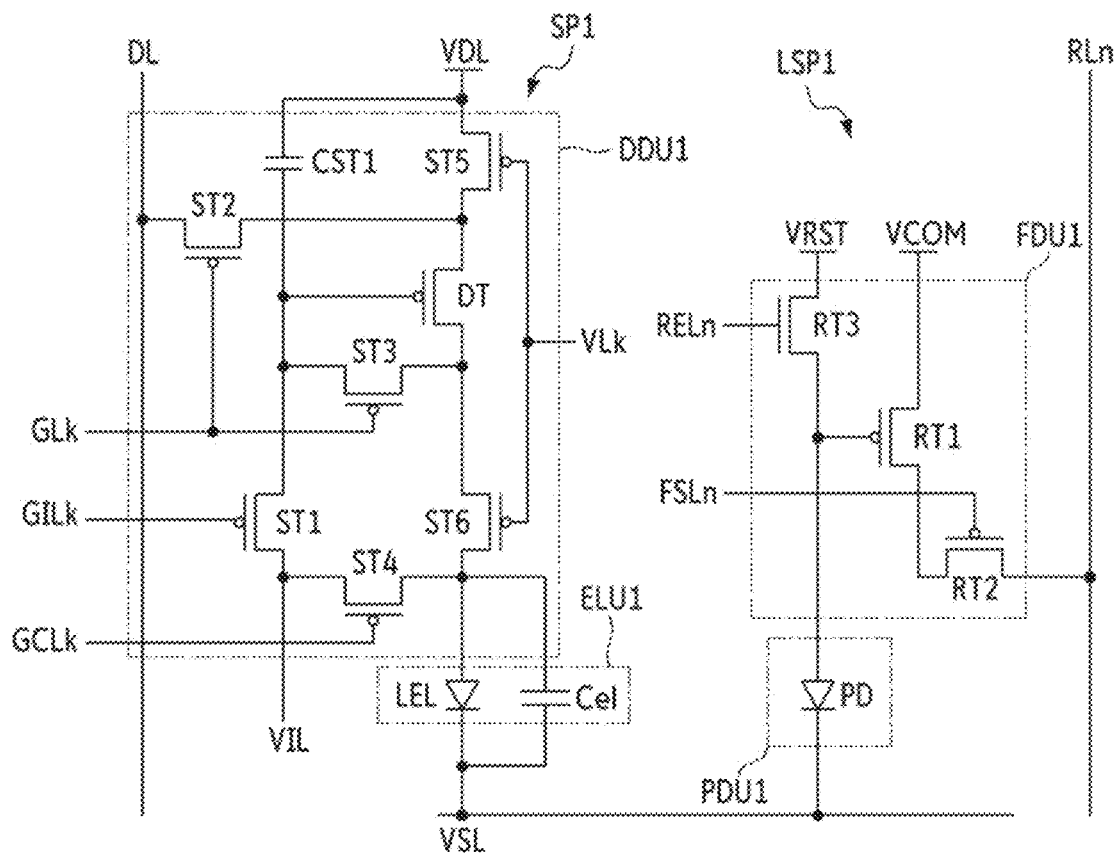
FIG. 7 is a circuit diagram of a display pixel and a light sensing pixel according to an embodiment of the present invention.

FIG. 7 is a circuit diagram of a display pixel SP and a light sensing pixel LSP according to an embodiment of the present invention.

Referring to FIG. 7, each first display pixel SP1 according to the embodiment may be connected to a $k^{th}$ display initialization line GILk, a $k^{th}$ display scan line GLk, a $k^{th}$ display control line GCLk, and a $k^{th}$ emission control line VLK. In addition, each first display pixel SP1 may be connected to a first driving voltage line VDL to which a first driving voltage is supplied, a second driving voltage line VSL to which a second driving voltage is supplied, and a third driving voltage line VIL to which a third driving voltage is supplied. Here, alphabets k and n used instead of numbers are defined as positive integers excluding 0 (zero).

Each first display pixel SP1 may include a light emitting unit ELU1 and a first pixel driving unit DDU1. The first light emitting unit ELU1 may include a light emitting element LEL. The first pixel driving unit DDU1 may include a driving transistor DT, switching elements, and a capacitor CST1. The switching elements include first through sixth transistors ST1 through ST6.

The driving transistor DT may include a gate electrode, a first electrode, and a second electrode. The driving transistor DT controls a drain-source current Ids (hereinafter, referred to as a "driving current") flowing between the first electrode and the second electrode according to a data voltage that is applied to the gate electrode. The driving current Ids flowing through a channel of the driving transistor DT is proportional to the square of a difference between a voltage Vsg between the first electrode and the gate electrode of the driving transistor DT and a threshold voltage as shown in Equation 1 below.

$$Ids = k' \times (Vsg - Vth)^2, \qquad (1)$$

where k' is a proportional coefficient determined by the structure and physical characteristics of a driving transistor, Vsg is a voltage between a first electrode and a gate electrode of the driving transistor, and Vth is a threshold voltage of the driving transistor.

The light emitting element LEL emits light according to the driving current Ids. As the driving current Ids increases, the amount of light emitted from the light emitting element LEL may increase.

The light emitting element LEL may be an organic light emitting diode including an organic light emitting layer disposed between an anode and a cathode. In addition, the light emitting element LEL may be an inorganic light emitting element including an inorganic semiconductor disposed between an anode and a cathode. In addition, the light emitting element LEL may be a quantum dot light emitting element including a quantum dot light emitting layer disposed between an anode and a cathode. In addition, the light emitting element LEL may be a micro-light emitting element including a micro-light emitting diode disposed between an anode and a cathode.

The anode of the light emitting element LEL may be connected to a first electrode of the fourth transistor ST4 and a second electrode of the sixth transistor ST6, and the cathode may be connected to the second driving voltage line VSL. A parasitic capacitance Cel may be formed between the anode and the cathode of the light emitting element LEL.

The first transistor ST1 is turned on by an initialization scan signal of the $k^{th}$ display initialization line GILk to connect the gate electrode of the driving transistor DT to the third driving voltage line VIL. Accordingly, the third driving voltage VINT of the third driving voltage line VIL may be applied to the gate electrode of the driving transistor DT. The first transistor ST1 may have a gate electrode that is connected to the $k^{th}$ display initialization line GILk, a first electrode connected to the gate electrode of the driving transistor DT, and a second electrode connected to the third driving voltage line VIL.

The second transistor ST2 is turned on by a display scan signal of the $k^{th}$ display scan line GLk to connect the first electrode of the driving transistor DT to a data line DL. Accordingly, a data voltage of the data line DL may be applied to the first electrode of the driving transistor DT. The second transistor ST2 may have a gate electrode that is connected to the $k^{th}$ display scan line GLk, a first electrode that is connected to the first electrode of the driving transistor DT, and a second electrode that is connected to the data line DL.

The third transistor ST3 is turned on by the display scan signal of the $k^{th}$ display scan line GLk to connect the gate electrode and the second electrode of the driving transistor DT to each other. When the gate electrode and the second electrode of the driving transistor DT are connected to each other, the driving transistor DT operates as a diode. The third transistor ST3 may have a gate electrode that is connected to the $k^{th}$ display scan line GLk, a first electrode that is connected to the second electrode of the driving transistor DT, and a second electrode that is connected to the gate electrode of the driving transistor DT.

The fourth transistor ST4 is turned on by a display control signal of the $k^{th}$ display control line GCLk to connect the anode of the light emitting element LEL to the third driving voltage line VIL. The third driving voltage of the third driving voltage line VIL may be applied to the anode of the light emitting element LEL. The fourth transistor ST4 may have a gate electrode that is connected to the $k^{th}$ display control line GCLk, the first electrode that is connected to the anode of the light emitting element LEL, and a second electrode that is connected to the third driving voltage line VIL.

The fifth transistor ST5 is turned on by an emission control signal of the $k^{th}$ emission control line VLK to connect the first electrode of the driving transistor DT to the first driving voltage line VDL. The fifth transistor ST5 may have a gate electrode that is connected to the $k^{th}$ emission control line VLK, a first electrode that is connected to the first driving voltage line VDL, and a second electrode that is connected to the first electrode of the driving transistor DT.

The sixth transistor ST6 is disposed between the second electrode of the driving transistor DT and the anode of the light emitting element LEL. The sixth transistor ST6 is turned on by the emission control signal of the $k^{th}$ emission control line VLK to connect the second electrode of the driving transistor DT to the anode of the light emitting element LEL. The sixth transistor ST6 may have a gate electrode that is connected to the $k^{th}$ emission control line VLk, a first electrode that is connected to the second electrode of the driving transistor DT, and the second electrode that is connected to the anode of the light emitting element LEL.

When both the fifth transistor ST5 and the sixth transistor ST6 are turned on, the driving current Ids of the driving transistor DT according to the data voltage that is applied to the gate electrode of the driving transistor DT may flow to the light emitting element LEL.

The capacitor CST1 is formed between the gate electrode of the driving transistor DT and the first driving voltage line VDL. A first capacitor electrode of the capacitor CST1 may be connected to the gate electrode of the driving transistor DT, and a second capacitor electrode of the capacitor CST1 may be connected to the first driving voltage line VDL.

When the first electrode of each of the first through sixth transistors ST1 through ST6 and the driving transistor DT is a source electrode, the second electrode of each of the first through sixth transistors ST1 through ST6 and the driving transistor DT may be a drain electrode. In addition, when the first electrode of each of the first through sixth transistors ST1 through ST6 and the driving transistor DT is a drain electrode, the second electrode of each of the first through sixth transistors ST1 through ST6 and the driving transistor DT may be a source electrode.

An active layer of each of the first through sixth transistors ST1 through ST6 and the driving transistor DT may be made of any one of, for example, polysilicon, amorphous silicon, and an oxide semiconductor. Although a case where the first through sixth transistors ST1 through ST6 and the driving transistor DT are formed as P-type metal-oxide-semiconductor field effect transistors (MOSFETs) has been mainly described in FIG. 7, the present invention is not limited thereto. For example, the first through sixth transistors ST1 through ST6 and the driving transistor DT may also be formed as N-type MOSFETs. In addition, at least one of the first through sixth transistors ST1 through ST6 may be formed as an N-type MOSFET.

Each first light sensing pixel LSP1 is electrically connected to an $n^{th}$ sensing reset line RELn, an $n^{th}$ light sensing scan line FSLn, and an $n^{th}$ light sensing line RLn. Each first light sensing pixel LSP may be reset by a reset signal from the $n^{th}$ sensing reset line RELn and may transmit a light sensing signal to the $n^{th}$ light sensing line RLn in response to a sensing scan signal from the $n^{th}$ light sensing scan line FSLn.

Each first light sensing pixel LSP1 may be divided into a first light sensing unit PDU1 including a light sensing element PD and a first sensing driving unit FDU1 including first through third sensing transistors RT1 through RT3 and a sensing capacitor. Here, the sensing capacitor may be formed in a parallel structure to the light sensing element PD.

The first sensing transistor RT1 of the first sensing driving unit FDU1 may allow a light sensing current to flow according to the voltage of the light sensing element PD and the sensing capacitor. The amount of the light sensing current may vary according to the voltage applied to the light sensing element PD and the sensing capacitor. A gate electrode of the first sensing transistor RT1 may be connected to a second electrode of the light sensing element PD. A first electrode of the first sensing transistor RT1 may be connected to a common voltage source VCOM to which a common voltage is applied. A second electrode of the first sensing transistor RT1 may be connected to a first electrode of the second sensing transistor RT2.

The second sensing transistor RT2 may allow the sensing current of the first sensing transistor RT1 to flow to the $n^{th}$ light sensing line RLn when a sensing scan signal of a gate-on voltage is transmitted to the $n^{th}$ light sensing scan line FSLn. In this case, the $n^{th}$ light sensing line RLn may be charged with a sensing voltage by the sensing current. The second sensing transistor RT2 may have a gate electrode that is connected to the $n^{th}$ light sensing scan line FSLn, the first electrode that is connected to the second electrode of the first sensing transistor RT1, and a second electrode that is connected to the $n^{th}$ light sensing line RLn.

The third sensing transistor RT3 may reset the voltage of the light sensing element PD and the sensing capacitor to a reset voltage of a reset voltage source VRST when a reset signal of a gate-on voltage is transmitted to the $n^{th}$ sensing reset line RELn. The third sensing transistor RT3 may have a gate electrode that is connected to the $n^{th}$ sensing reset line RELn, a first electrode that is connected to the reset voltage source VRST, and a second electrode that is connected to the second electrode of the light sensing element PD.

In FIG. 7, a case where the first sensing transistor RT1 and the second sensing transistor RT2 are formed as P-type MOSFETs and the third sensing transistor RT3 is formed as an N-type MOSFET has been mainly described. However, embodiments of the present invention are not limited thereto, and they may be optionally formed as the same type or different types from each other. In addition, any one of the first electrode and the second electrode of each of the first sensing transistor RT1, the second sensing transistor RT2 and the third sensing transistor RT3 may be a source electrode, and the other of the first electrode and second electrode may be a drain electrode.

Figure 8:
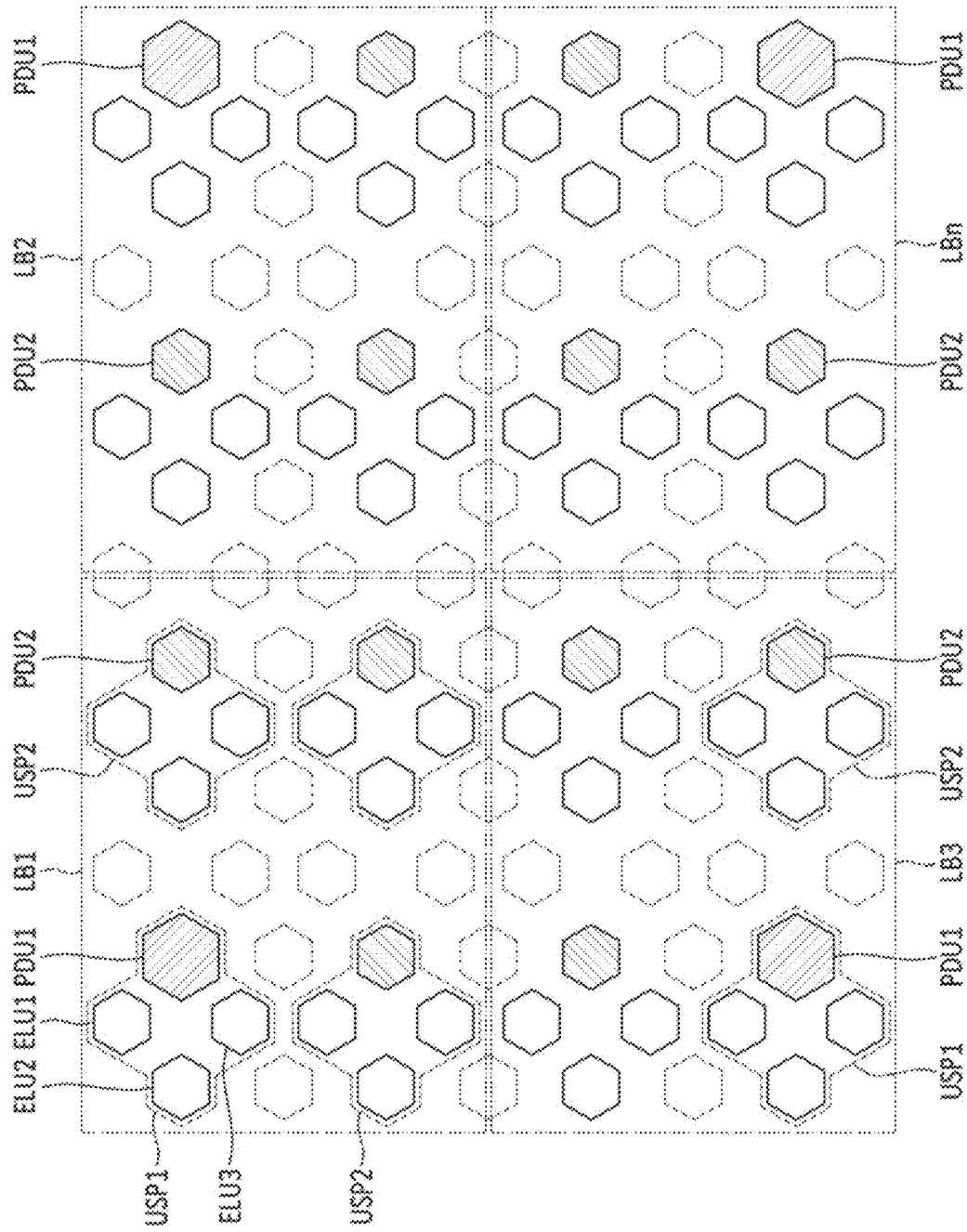
FIG. 8 is a layout view illustrating the arrangement structure of light emitting units and first and second light sensing units of the display area according to the embodiment of the present invention.

FIG. 8 is a layout view illustrating the arrangement structure of light emitting units and first and second light sensing units of the display area DA according to the embodiment of the present invention.

Referring to FIG. 8, a plurality of code pattern placement areas LB1 through LBn preset to place code patterns are defined in the display unit DU of the display panel 100.

At least one first unit pixel USP1 and a plurality of second unit pixels USP2 are disposed in each of the code pattern placement areas LB1 through LBn.

At least one first unit pixel USP1 disposed in each of the code pattern placement areas LB1 through LBn includes a first light sensing pixel LSP1, which includes a first light sensing unit PDU1 of a first size (or a first area), a first display pixel SP1, a second display pixel SP2, and a third display pixel SP3.

In addition, a plurality of second unit pixels USP2 disposed in each of the code pattern placement areas LB1 through LBn each include a second light sensing pixel LSP2, which includes a second light sensing unit PDU2 of a second size (or a second area), a first display pixel SP1, a second display pixel SP2, and a third display pixel SP3.

The first light sensing unit PDU1 of the first light sensing pixel LSP1, the second light sensing unit PDU2 of the second light sensing pixel LSP2, and first through third light emitting units ELU1 through ELU3 of the first through third display pixels SP1 through SP3 are exposed on the front side of the code pattern placement areas LB1 through LBn. Accordingly, an image is displayed through the first through third light emitting units ELU1 through ELU3 of the first through third display pixels SP1 through SP3 that form each of the unit pixels USP1 and USP2. In addition, the first light sensing unit PDU1 or the second light sensing unit PDU2 of each of the unit pixels USP1 and USP2 receives light that is incident on a front surface and generates a light sensing signal according to the amount of light received.

For example, each of the code pattern placement areas LB1 through LBn may include one first unit pixel USP1 and three second unit pixels USP2.

The first unit pixel USP1 includes one first light sensing pixel LSP1, which includes a first light sensing unit PDU1 of a first size (or a first area), and first through third display pixels SP1 through SP3.

Each of the three second unit pixels USP2 includes a second light sensing pixel LSP2, which includes a second light sensing unit PDU2 of a second size (or a second area) smaller than the first size (or the first area), and first through third display pixels SP1 through SP3.

In each of the code pattern placement areas LB1 through LBn, a plurality of display pixels SP for displaying an image may be disposed in a matrix structure, in addition to at least one first unit pixel USP1 and a plurality of second unit pixels USP2 disposed to display a code pattern.

In each of the code pattern placement areas LB1 through LBn, third unit pixels, each composed of four display pixels, may be disposed. Each of the third unit pixels may include first through third display pixels SP1 through SP3 and may further include any one (e.g., the second display pixel SP2) of the first through third display pixels SP1 through SP3. Each of the third unit pixels displays an image through the four display pixels without sensing or receiving light.

Figure 9:
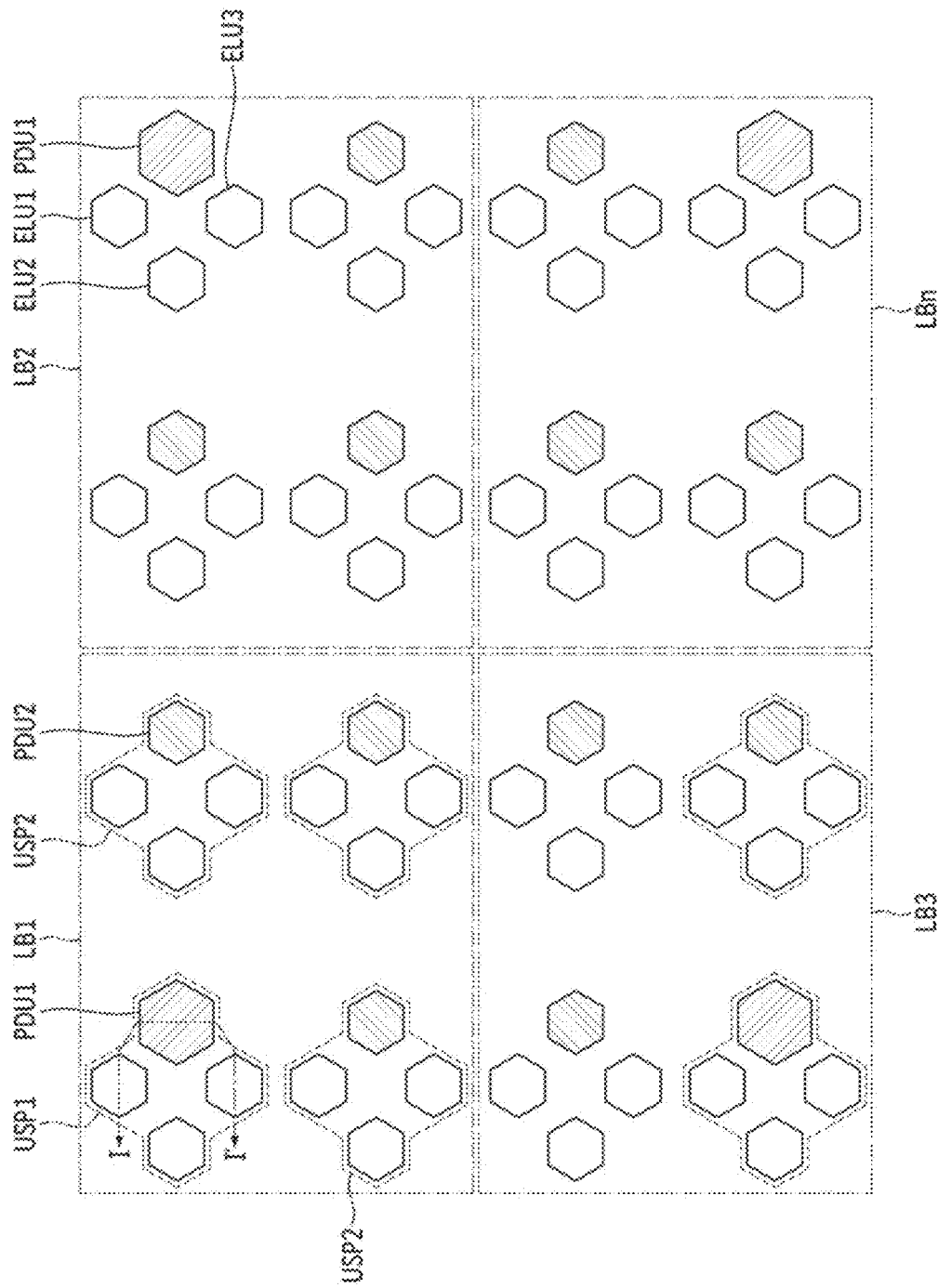
FIG. 9 is a layout view illustrating the arrangement structure of light emitting units and first and second light sensing units that form preset code patterns.

FIG. 9 is a layout view illustrating the arrangement structure of light emitting units and first and second light sensing units that form preset code patterns.

Referring to FIG. 9, one first unit pixel USP1 and three second unit pixels USP2 included in each of the code pattern placement areas LB1 through LBn are arranged and disposed to display a preset code patterns.

For example, one first unit pixel USP1 and three second unit pixels USP2 may be arranged in a 2×2 structure in at least one code pattern placement area LB1 among the code pattern placement areas LB1 through LBn.

For example, one first unit pixel USP1 and one second unit pixel USP2 may be disposed side by side in the first direction (X-axis direction), and another second unit pixel USP2 may be disposed side by side with the one first unit pixel USP1 in the second direction (Y-axis direction) that is substantially perpendicular to the first direction (X-axis direction). In addition, another second unit pixel USP2 may be disposed side by side with the adjacent second unit pixels USP2 in the first and second directions, respectively, and may be disposed in a diagonal direction to the one first unit pixel USP1. According to this arrangement form of one first unit pixel USP1 and three second unit pixels USP2, a preset "00" code pattern may be formed in at least one code pattern placement area LB1 among the code pattern placement areas LB1 through LBn.

For another example, one first unit pixel USP1 and three second unit pixels USP2 are arranged in a 2×2 structure in at least one code pattern placement area LB2 among the code pattern placement areas LB1 through LBn.

For example, one second unit pixel USP2 and another second unit pixel USP2 may be disposed side by side in the second direction (Y-axis direction) which is the vertical direction, and one first unit pixel USP1 may be disposed side by side with the one second unit pixel USP2 in the first direction (X-axis direction). In addition, another second unit pixel USP2 may be disposed side by side with the adjacent first unit pixel USP1 in the second direction (Y-axis direction) and disposed side by side with the adjacent second unit pixel USP2 in the first direction. In this way, according to the arrangement form of one first unit pixel USP1 and three second unit pixels USP2 in at least one code pattern placement area LB2, a preset "01" code pattern may be formed in the at least one code pattern placement area LB2.

For another example, one first unit pixel USP1 and three second unit pixels USP2 are arranged in a 2×2 structure in at least one code pattern placement area LB3 among the code pattern placement areas LB1 through LBn.

For example, one second unit pixel USP2 and one first unit pixel USP1 may be disposed side by side in the second direction (Y-axis direction) which is the vertical direction, and another second unit pixel USP2 may be disposed side by side with the one second unit pixel USP2 in the first direction (X-axis direction) which is the horizontal direction. In addition, another second unit pixel USP2 may be disposed side by side with the adjacent first unit pixel USP1 in the first direction (X-axis direction) and disposed side by side with the adjacent second unit pixel USP2 in the second direction (Y-axis direction). In this way, according to the arrangement form of one first unit pixel USP1 and three second unit pixels USP2 in at least one code pattern placement area LB3, a preset "10" code pattern may be formed in the at least one code pattern placement area LB3.

One first unit pixel USP1 and three second unit pixels USP2 may be arranged in a 2×2 structure in at least one code pattern placement area LBn among the code pattern placement areas LB1 through LBn.

For example, one second unit pixel USP2 and another second unit pixel USP2 may be disposed side by side in the first direction (X-axis direction) which is the horizontal direction, and another second unit pixel USP2 may be disposed side by side with the adjacent one second unit pixel USP2 in the second direction (Y-axis direction) which is the vertical direction. In addition, one first unit pixel USP1 may be disposed side by side with the adjacent second unit pixels USP2 in the first and second directions (X-axis and Y-axis directions), respectively. In this way, according to the arrangement form of one first unit pixel USP1 and three second unit pixels USP2 in at least one code pattern placement area LBn, a preset "11" code pattern may be formed in the at least one code pattern placement area LBn.

Figure 10:
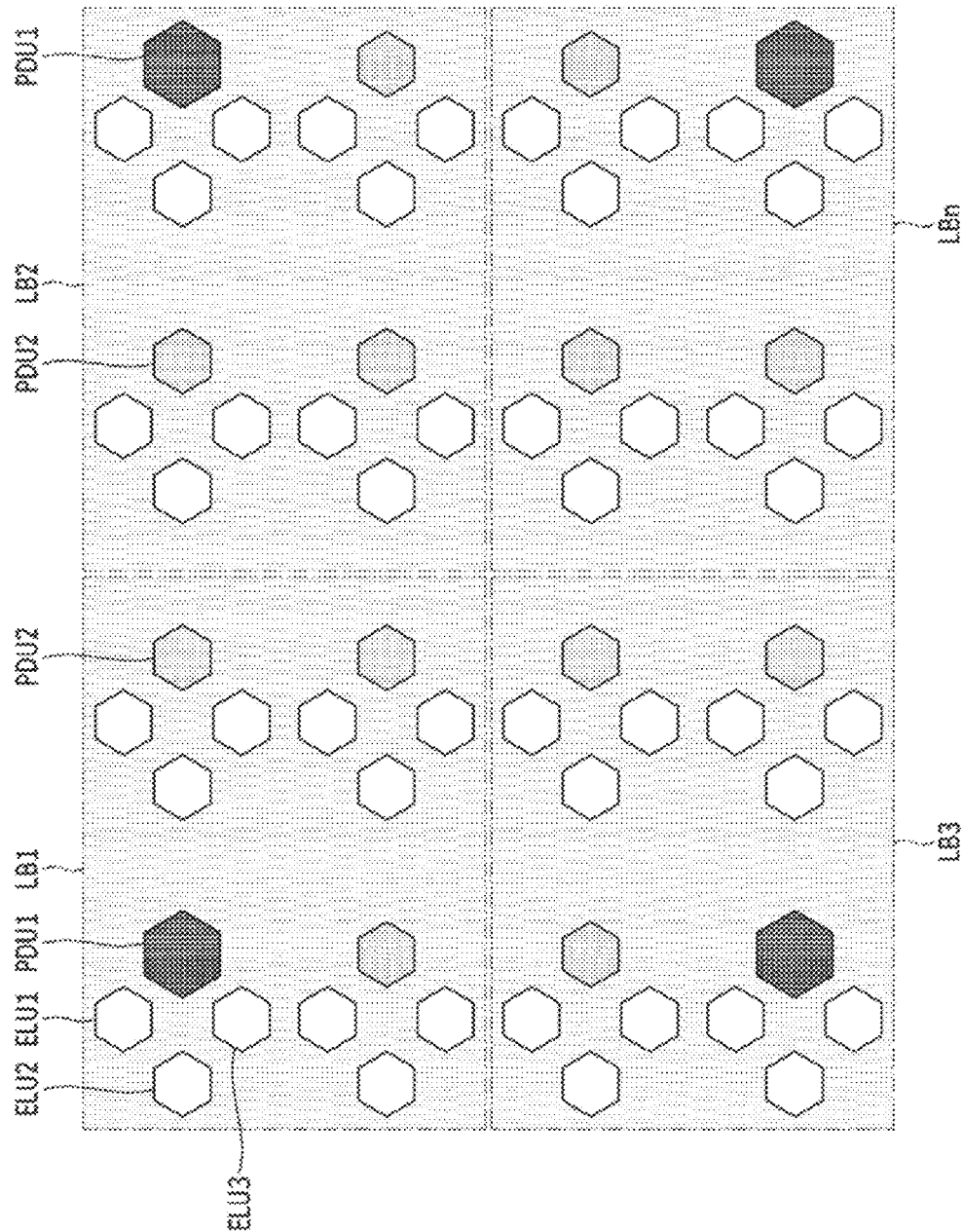
FIG. 10 is an image drawing illustrating code pattern shapes detected through the position input device of FIGS. 1 and 2.

FIG. 10 is an image drawing illustrating code pattern shapes detected through the position input device 20 of FIGS. 1 and 2.

Referring to FIG. 10, by using an optical method, the code detector 21 of the position input device 20 applies light of a preset wavelength band (e.g., an infrared wavelength band) to at least one code pattern placement area LB1 through LBn that it faces among the code pattern placement areas LB1 through LBn of the display panel 100. Then, it detects shape data of code patterns by sensing the light of the preset wavelength band reflected from the at least one code pattern placement area LB1 through LBn.

As described above, preset code patterns are formed according to the arrangement structure of one first unit pixel USP1 including one first light sensing pixel LSP1, which includes a first light sensing unit PDU1 of a first size (or a first area), and first through third display pixels SP1 through SP3 and the arrangement structure of second unit pixels USP2, each including a second light sensing pixel LSP2, which includes a second light sensing unit PDU2 of a second size (or a second area) smaller than the first size (or the first area), and first through third display pixels SP1 through SP3.

Different shape data of code patterns may be detected and transmitted by the code detector 21 of the position input device 20 according to the arrangement structure of the first unit pixel USP1 and the second unit pixels USP2 in each of the code pattern placement areas LB1 through LBn. For example, different shape data of code patterns may be detected according to the arrangement form of the first light sensing unit PDU1 which receives a largest amount of light, the second light sensing unit PDU2 which receives a small amount of light, and the first through third display pixels SP1 through SP3 which emit light.

Therefore, the code processor 23 may continuously receive shape data of code patterns from the code detector 21. The code processor 23 continuously receives the shape data of the code patterns, identifies shapes and placement structures of the code patterns, and extracts or generates coordinate data.

Figure 11:
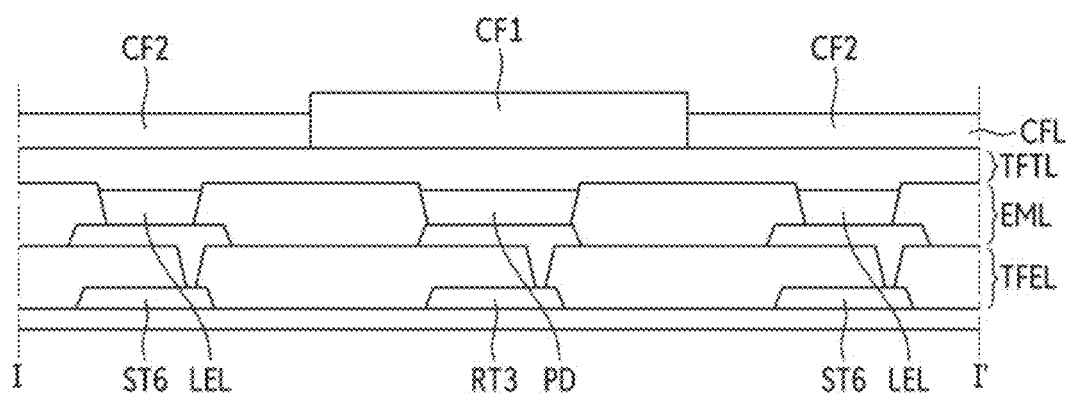
FIG. 11 is a cross-sectional view schematically illustrating the structure of a cross section taken along line I-I' of FIG. 9 in a block format.

FIG. 11 is a cross-sectional view schematically illustrating the structure of a cross section taken along line I-I' of FIG. 9 in a block format.

Referring to FIG. 11 together with FIG. 9, a first light sensing unit PDU1 of a first light sensing pixel LSP1 is formed to be larger and/or wider than each of a second light sensing unit PDU2 of a second light sensing pixel LSP2 and first through third light emitting units ELU1 through ELU3 of first through third display pixels SP1 through SP3. For example, a light sensing element PD of the first light sensing unit PDU1 is formed to be larger and/or wider than each of a light sensing element PD of the second light sensing unit PDU2 and light emitting elements LEL of the first through third light emitting units ELU1 through ELU3. Therefore, the amount of light received by the first light sensing unit PDU1 may be greater or larger than the amount of light received by the second light sensing unit PDU2.

In addition, the second light sensing unit PDU2 of the second light sensing pixel LSP2 is formed to be smaller and/or narrower than the first light sensing unit PDU1 of the first light sensing pixel LSP1 and is formed to be larger and/or wider than the first through third light emitting units ELU1 through ELU3 of the first through third display pixels SP1 through SP3. In other words, the light sensing element PD of the second light sensing unit PDU2 is formed to be smaller and/or narrower than the light sensing element PD of the first light sensing unit PDU1 and is formed to be larger and/or wider than the first through third light emitting units ELU1 through ELU3 of the first through third display pixels SP1 through SP3.

Therefore, the amount of light received by the first light sensing unit PDU1 may be less or smaller than the amount of light received by the first light sensing unit PDU1 and may be greater or larger than the amount of light received by the first through third light emitting units ELU1 through ELU3.

A color filter layer CFL which allows light of a preset visible light wavelength band to pass therethrough may be formed on the first light sensing unit PDU1, the second light sensing unit PDU2, and the first through third light emitting units ELU1 through ELU3. For example, the color filter CFL may be formed in front of the first light sensing unit PDU1, the second light sensing unit PDU2, and the first through third light emitting units ELU1 through ELU3. Here, a first color filter CF1 disposed on the first light sensing unit PDU1 and the second light sensing unit PDU2 may be formed to be larger and/or thicker than a second color filter CF2 that is disposed on the first through third light emitting units ELU1 through ELU3. Therefore, the amount of infrared light reflected in front of the first light sensing unit PDU1 and the second light sensing unit PDU2 may be less than the amount of infrared light reflected in front of the first through third light emitting units ELU1 through ELU3.

Figure 12:
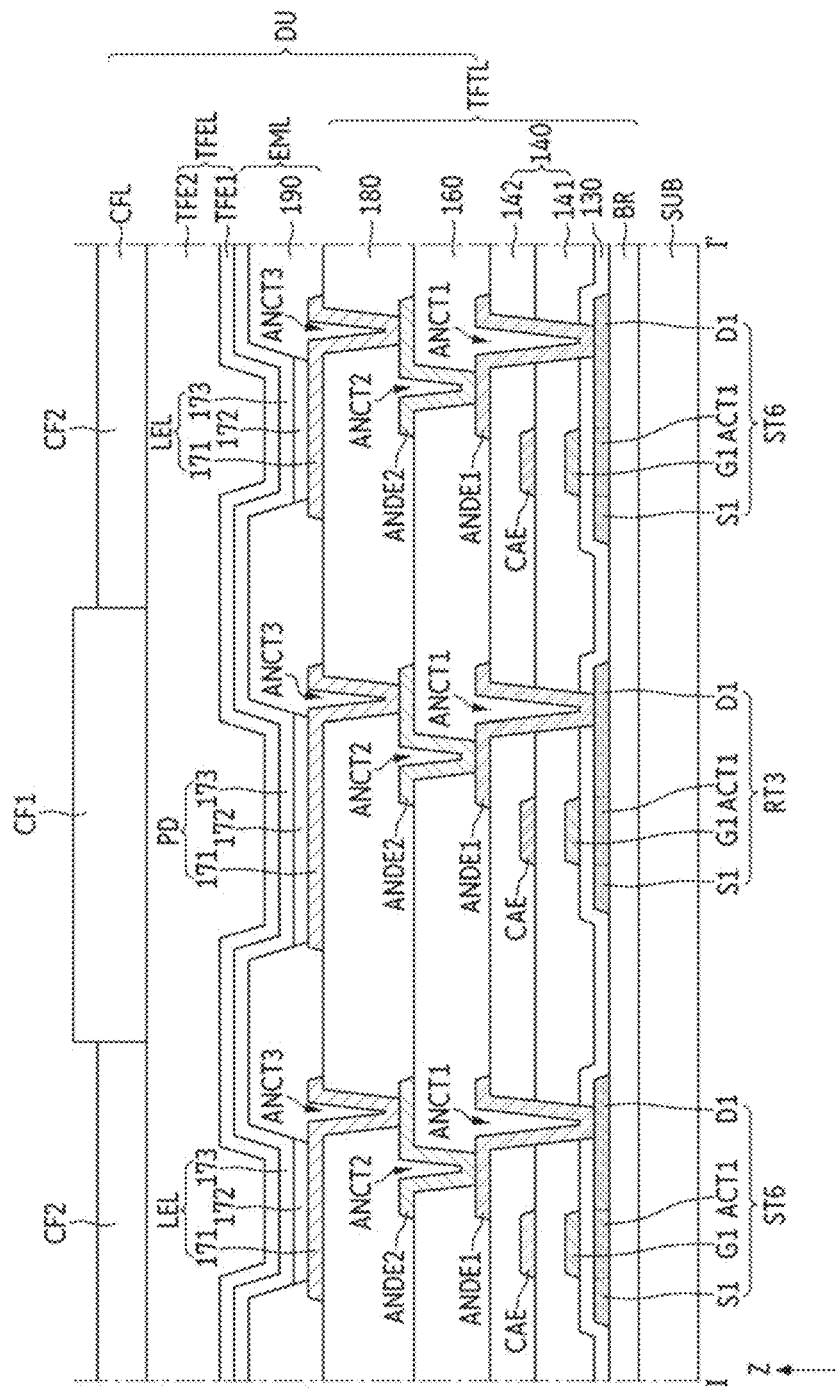
FIG. 12 is a cross-sectional view specifically illustrating the structure of the cross section taken along line I-I' of FIG. 9.

FIG. 12 is a cross-sectional view illustrating the structure of the cross section taken along line I-I' of FIG. 9.

Referring to FIGS. 11 and 12, the substrate SUB of the display panel 100 may be a base substrate or a base member. The substrate SUB may be a flexible substrate that can be bent, folded, rolled, etc. Here, the substrate SUB may include polymer resin such as polyimide (PI).

The thin-film transistor layer TFTL may be disposed on the substrate SUB. The thin-film transistor layer TFTL may include a plurality of thin-film transistors constituting a first pixel driving unit DDU1 of the first display pixel SP1 and a first sensing driving unit FDU1 of the first light sensing pixel LSP1.

For example, a barrier layer BR is a layer for protecting the thin-film transistors of the thin-film transistor layer TFTL and organic layers 172 of the light emitting element layer EML from moisture that may be introduced through the substrate SUB which is vulnerable to moisture penetration. The barrier layer BR may be composed of a plurality of inorganic layers alternately stacked on each other.

Thin-film transistors ST6 and RT3 may be disposed on the barrier layer BR. Each of the thin-film transistors ST6 and RT3 includes an active layer ACT1, a gate electrode G1, a source electrode S1, and a drain electrode D1.

The active layer ACT1, the source electrode S1 and the drain electrode D1 of each of the thin-film transistors ST6 and RT3 may be disposed on the barrier layer BR. The active layer ACT1 of each of the thin-film transistors ST6 and RT3 includes, for example, polycrystalline silicon, monocrystalline silicon, low-temperature polycrystalline silicon, amorphous silicon, or an oxide semiconductor. The active layer ACT1 overlapped by the gate electrode G1 in a third direction (Z-axis direction) which is a thickness direction of the substrate SUB may be a channel region. The source electrode S1 and the drain electrode D1 are regions that are not overlapped by the gate electrode G1 in the third direction (Z-axis direction) and may be formed to have conductivity by doping a silicon semiconductor or an oxide semiconductor with ions or impurities.

A gate insulating layer 130 may be disposed on the active layer ACT1, the source electrode S1 and the drain electrode D1 of each of the thin-film transistors ST6 and RT3.

The gate electrode G1 of each of the thin-film transistors ST6 and RT3 may be disposed on the gate insulating layer 130. The gate electrode G1 may overlap the active layer ACT1 in the third direction (Z-axis direction).

A first interlayer insulating layer 141 may be disposed on the gate electrode G1 of each of the thin-film transistors ST6 and RT3.

Capacitor electrodes CAE may be disposed on the first interlayer insulating layer 141. A capacitor electrode CAE may overlap the gate electrode G1 of each of the thin-film transistors ST6 and RT3 in the third direction (Z-axis direction). Since the first interlayer insulating layer 141 has a predetermined dielectric constant, capacitors may be formed by the capacitor electrodes CAE, the gate electrodes G1, and the first interlayer insulating layer 141 disposed between them. In addition, a second interlayer insulating layer 142 may be disposed on the capacitor electrodes CAE.

First anode connection electrodes ANDE1 may be disposed on the second interlayer insulating layer 142. A first anode connection electrode ANDE1 may be connected to the drain electrode D1 of each of the thin-film transistors ST6 and RT3 through a first connection contact hole ANCT1 penetrating the gate insulating layer 130, the first interlayer insulating layer 141, and the second interlayer insulating layer 142. In addition, a first planarization layer 160 may be disposed on the first anode connection electrodes ANDE1 to planarize a step caused by each of the thin-film transistors ST6 and RT3.

Second anode connection electrodes ANDE2 may be disposed on the first planarization layer 160. The second anode connection electrodes ANDE2 may be connected to the first anode connection electrodes ANDE1 through second connection contact holes ANCT2 penetrating the first planarization layer 160. In addition, a second planarization layer 180 may be disposed on the second anode connection electrodes ANDE2.

The light emitting element layer EML may be disposed on the thin-film transistor layer TFTL. The light emitting element layer EML may include a pixel defining layer which provides areas where a plurality of light emitting elements LEL, each including a first electrode, an organic layer and a second electrode are sequentially stacked to emit light, and a light sensing element PD are formed.

For example, the light emitting elements LEL, the light sensing element PD, and a pixel defining layer 190 may be disposed on the second planarization layer 180. Here, each of the light emitting elements LEL and the light sensing elements PD includes a pixel electrode 171, an organic layer 172, and a common electrode 173. The organic layer 172 of each of the light emitting elements LEL may be made of an organic light emitting material. Accordingly, an emission area of each of the light emitting elements LEL is an area where the pixel electrode 171, the organic layer 172, and the common electrode 173 are sequentially stacked on each other so that holes from the pixel electrode 171 and electrons from the common electrode 173 are combined with each other in the organic layer 172 to emit light.

In a top emission structure in which light is emitted from the organic layer 172 toward the common electrode 173, the pixel electrode 171 may be made of a metal material having high reflectivity, such as a stacked structure (Ti/Al/Ti) of aluminum and titanium, a stacked structure (ITO/Al/ITO) of aluminum and indium tin oxide, an APC alloy, or a stacked structure (ITO/APC/ITO) of an APC alloy and indium tin oxide. The APC alloy is an alloy of, for example, silver (Ag), palladium (Pd), and copper (Cu).

In the top emission structure, the common electrode 173 may be made of a transparent conductive material (TCO) that can transmit light, such as indium tin oxide (ITO) or indium zinc oxide (IZO), or a semi-transmissive conductive material such as magnesium (Mg), silver (Ag) or an alloy of Mg and Ag. When the common electrode 173 is made of a semi-transmissive conductive material, light output efficiency may be increased by a microcavity.

The encapsulation layer TFEL may be disposed on the common electrode 173. The encapsulation layer TFEL may include at least one inorganic layer to prevent oxygen or moisture from permeating into the light emitting element layer EML.

The color filter layer CFL which allows light of a preset visible light wavelength band to pass therethrough is formed on a front surface of the encapsulation layer TFEL.

For example, the color filter layer CFL may be formed in front of the first light sensing unit PDU1, the second light sensing unit PDU2, and the first through third light emitting units ELU1 through ELU3. Here, the first color filter CF1 disposed in front of the first light sensing unit PDU1 and the second light sensing unit PDU2 may be formed to be larger or thicker than the second color filter CF2 disposed in front of the first through third light emitting units ELU1 through ELU3. Therefore, the amount of infrared light reflected from in front of the first light sensing unit PDU1 and the second light sensing unit PDU2 may be less than the amount of infrared light reflected from in front of the first through third light emitting units ELU1 through ELU3.

While the present invention has been described with reference to the embodiments thereof, it will be understood by those of ordinary skill in the art that various changes in form and detail may be made thereto without departing from the spirit and scope of the present invention.

What is claimed is:

1. A display device comprising:
   a display unit including display pixels and light sensing pixels that are disposed in a preset code pattern shape in an image display area;
   a touch sensing unit formed on the display unit and configured to detect a touch position of a user; and
   a color filter layer disposed on the display pixels and the light sensing pixels,
   wherein the display pixels and the light sensing pixels are disposed in combination with each other in the preset code pattern shape to form code patterns for detecting position coordinates of a position input device.

2. The display device of claim 1, wherein the image display area comprises:
   code pattern placement areas defined in advance to place the code patterns according to positions where the code patterns are placed; and
   unit pixels disposed in each of the code pattern placement areas, wherein each of the unit pixels includes a portion of display pixels and at least one light sensing pixel of the light sensing pixels, wherein the unit pixels are arranged in a preset code pattern shape in each of the code pattern placement areas, and the code patterns comprise a position code detection pattern sensed by the position input device.

3. The display device of claim 2, wherein the light sensing pixels respectively included in the unit pixels have light sensing units of a same size as each other or different sizes from each other, respectively, and sense and receive different amounts of light according to the sizes of the light sensing units.

4. The display device of claim 2, wherein at least one first unit pixel among the unit pixels comprises a first light sensing pixel comprising a first light sensing unit of a first area, a first display pixel, a second display pixel and a third display pixel, and at least one second unit pixel among the unit pixels comprises a second light sensing pixel comprising a second light sensing unit of a second area, a first display pixel, a second display pixel and a third display pixel, wherein the first area is larger and/or wider than the second area.

5. The display device of claim 2, wherein each of the code pattern placement areas comprises:
a first unit pixel comprising one first light sensing pixel, which comprises a first light sensing unit of a first area, and first through third display pixels; and
three second unit pixels, each comprising a second light sensing pixel, which comprises a second light sensing unit of a second area smaller than the first area, and first through third display pixels.

6. The display device of claim 5, wherein the first unit pixel and the three second unit pixels are arranged in a 2×2 structure in at least one first code pattern placement area among the code pattern placement areas, wherein the first unit pixel and a first second unit pixel of the three second unit pixels are disposed side by side in a first direction, wherein a second second unit pixel of the three second unit pixels and the first unit pixel are disposed side by side in a second direction which is perpendicular to the first direction, and wherein a third second unit pixel of the three second unit pixels is disposed side by side with the second second unit pixel in the first direction and the first second unit pixel in the second direction, so that a preset "00" code pattern is formed according to the arrangement form of the first unit pixel and the three second unit pixels.

7. The display device of claim 5, wherein the one first unit pixel and the three second unit pixels are arranged in a 2×2 structure in at least one first code pattern placement area among the code pattern placement areas, wherein a first second unit pixel and a second second unit pixel among the three second unit pixels are disposed side by side in a second direction, wherein the first unit pixel is disposed side by side with the first second unit pixel in a first direction which is perpendicular to the second direction, and a third second unit pixel of the three second unit pixels is disposed side by side with the first unit pixel in the second direction and disposed side by side with the second second unit pixel in the first direction, so that a preset "01" code pattern is formed according to the arrangement form of the first unit pixel and the three second unit pixels.

8. The display device of claim 5, wherein the one first unit pixel and the three second unit pixels are arranged in a 2×2 structure in at least one first code pattern placement area among the code pattern placement areas, wherein a first second unit pixel among the three second unit pixels and the first unit pixel are disposed side by side in a second direction, wherein a second second unit pixel of the three second unit pixels is disposed side by side with the first second unit pixel in a first direction which is perpendicular to the second direction, and a third second unit pixel of the three second unit pixels is disposed side by side with the first unit pixel in the first direction and disposed side by side with the second second unit pixel in the second direction, so that a preset "10" code pattern is formed according to the arrangement form of the first unit pixel and the three second unit pixels.

9. The display device of claim 5, wherein the first unit pixel and the three second unit pixels are arranged in a 2×2 structure in at least one first code pattern placement area among the code pattern placement areas, wherein a first second unit pixel and a second second unit pixel among the three second unit pixels are disposed side by side in a first direction, wherein a third second unit pixel of the three second unit pixels is disposed side by side with the first second unit pixel in a second direction which is perpendicular to the first direction, and the first unit pixel is disposed side by side with the second second unit pixel in the second direction, so that a preset "11" code pattern is formed according to the arrangement form of the first unit pixel and the three second unit pixels.

10. The display device of claim 5, wherein the first light sensing unit of the first light sensing pixel is formed to be larger and/or wider than each of the second light sensing unit of the second light sensing pixel and first through third light emitting units of the first through third display pixels, and wherein the second light sensing unit of the second light sensing pixel is formed to be smaller and/or narrower than the first light sensing unit of the first light sensing pixel and larger and/or wider than the first through third light emitting units of the first through third display pixels.

11. The display device of claim 10, wherein the color filter layer comprises:
a plurality of first color filters disposed on the first light sensing unit and the second light sensing unit to allow light of a preset visible light wavelength band to pass therethrough; and
a plurality of second color filters disposed on the first through third light emitting units to allow light of a preset visible light wavelength band to pass therethrough,
wherein the first color filters are formed to be larger and thicker than the second color filters.

12. A position input system comprising:
a display device displaying an image; and
a position input device inputting position coordinate data to the display device,
wherein the display device comprises:
a display unit including display pixels and light sensing pixels that are disposed in a preset code pattern shape in an image display area;
a touch sensing unit formed on the display unit and configured to detect a touch position of a user; and
a color filter layer disposed on the display pixels and the light sensing pixels,
wherein the display pixels and the light sensing pixels are disposed in combination with each other in the preset code pattern shape to form code patterns for detecting position coordinates of the position input device.

13. The position input system of claim 12, wherein the image display area comprises:
code pattern placement areas defined in advance to place the code patterns according to positions where the code patterns are placed; and
unit pixels disposed in each of the code pattern placement areas, wherein each of the unit pixels includes a plurality of display pixels and at least one light sensing pixel, wherein the unit pixels are arranged in a preset code pattern shape in each of the code pattern placement areas, and the code patterns comprise a position code detection pattern sensed by the position input device.

14. The position input system of claim 13, wherein each of the code pattern placement areas comprises:
- a first unit pixel comprising one first light sensing pixel, which comprises a first light sensing unit of a first area, and first through third display pixels; and
- three second unit pixels, each comprising a second light sensing pixel, which comprises a second light sensing unit of a second area that is smaller than the first area, and first through third display pixels.

15. The position input system of claim 14, wherein the first light sensing unit of the first light sensing pixel is formed to be larger and/or wider than each of the second light sensing unit of the second light sensing pixel and first through third light emitting units of the first through third display pixels, and the second light sensing unit of the second light sensing pixel is formed to be smaller and/or narrower than the first light sensing unit of the first light sensing pixel and larger and/or wider than the first through third light emitting units of the first through third display pixels.

16. The position input system of claim 15, wherein the color filter layer comprises:
- a plurality of first color filters disposed on the first light sensing unit and the second light sensing unit to allow light of a preset visible light wavelength band to pass therethrough; and
- a plurality of second color filters disposed on the first through third light emitting units to allow light of a preset visible light wavelength band to pass therethrough,
- wherein the first color filters are formed to be larger and thicker than the second color filters.

17. An electronic device, comprising:
a display device including:
- a display unit including a plurality of display pixels and a plurality of light sensing pixels that are disposed in a preset code pattern shape in an image display area; and
- a touch sensing unit formed on the display unit and configured to detect a touch position of a user,
- wherein the plurality of display pixels and the plurality of light sensing pixels are disposed in combination with each other in the preset code pattern shape to form code patterns for detecting position coordinates of a position input device,
- wherein the image display area includes code placement areas in which unit pixels are disposed, and each code placement area has a different arrangement of unit pixels from each other, wherein each of the unit pixels includes a portion of the plurality display pixels and a light sensing pixel of the plurality of light sensing pixels.

18. The electronic device of claim 17, wherein, the light sensing pixels respectively included in the unit pixels have light sensing units of a same size as each other or different sizes from each other.

19. The electronic device of claim 17, further comprising a color filter layer disposed on the plurality of display pixels and the plurality of light sensing pixels.

20. The electronic device of claim 17, wherein a first unit pixel among the unit pixels comprises a first light sensing pixel comprising a first light sensing unit of a first area, a first display pixel, a second display pixel and a third display pixel, wherein the first light sensing unit is larger than each of first through third light emitting units of the first through third display pixels.

* * * * *